(12) United States Patent
Mutlu et al.

(10) Patent No.: US 11,474,023 B2
(45) Date of Patent: Oct. 18, 2022

(54) OSCILLATORY FOCUSING OF PARTICLES IN CHANNELS

(71) Applicant: The General Hospital Corporation, Boston, MA (US)

(72) Inventors: Baris R. Mutlu, Cambridge, MA (US); Jon F. Edd, Wakefield, MA (US); Mehmet Toner, Charlestown, MA (US)

(73) Assignee: The General Hospital Corporation, Boston, MA (US)

(*) Notice: Subject to any disclaimer, the term of this patent is extended or adjusted under 35 U.S.C. 154(b) by 0 days.

(21) Appl. No.: 16/617,114

(22) PCT Filed: Jun. 4, 2018

(86) PCT No.: PCT/US2018/035865
§ 371 (c)(1),
(2) Date: Nov. 26, 2019

(87) PCT Pub. No.: WO2018/223132
PCT Pub. Date: Dec. 6, 2018

(65) Prior Publication Data
US 2021/0055202 A1    Feb. 25, 2021

Related U.S. Application Data

(60) Provisional application No. 62/514,606, filed on Jun. 2, 2017.

(51) Int. Cl.
*G01N 15/14*  (2006.01)
(52) U.S. Cl.
CPC ..... *G01N 15/1459* (2013.01); *G01N 15/1404* (2013.01); *G01N 15/1484* (2013.01);
(Continued)

(58) Field of Classification Search
CPC .......... G01N 15/1459; G01N 15/1404; G01N 2015/1413; B01L 2200/0652; B01L 2400/0463
See application file for complete search history.

(56) References Cited

U.S. PATENT DOCUMENTS 8,186,913 B2    5/2012 Toner et al.
9,610,582 B2    4/2017 Kapur et al.
(Continued)

OTHER PUBLICATIONS

Gaetano D Avino, "Single line particle focusing induced by viscoelasticity of the suspending liquid: theory, experiments and simulations to design a micropipe flow-focuser", Feb. 17, 2012 (Year: 2012).*

(Continued)

*Primary Examiner* — Maurice C Smith
(74) *Attorney, Agent, or Firm* — Fish & Richardson P.C.

(57) ABSTRACT

This disclosure provides systems and methods to extend the capabilities of inertial and/or viscoelastic focusing in channels, such as microchannels. The new systems and methods can be integrated with existing microfluidic devices for inertial and/or viscoelastic manipulation of particles that have defied prior attempts, enabling a variety of applications in clinical diagnosis. The particles, e.g., bioparticles and cells, focus into streamlines in the same way and in the same locations as in existing inertial and viscoelastic focusing systems, but at much lower particle Reynolds numbers, much lower shear stress, over much shorter distances, and at lower driving pressures and/or flow rates.

35 Claims, 19 Drawing Sheets

(52) U.S. Cl.
CPC ... *B01L 2200/0652* (2013.01); *B01L 2400/04* (2013.01); *G01N 2015/1413* (2013.01)

(56) References Cited

U.S. PATENT DOCUMENTS

| | | | |
|---|---|---|---|
| 9,808,803 | B2 | 11/2017 | Toner et al. |
| 9,895,694 | B2 | 2/2018 | Kapur et al. |
| 2008/0268469 | A1* | 10/2008 | Srienc ............... G01N 21/4788 435/7.2 |
| 2008/0283402 | A1* | 11/2008 | Peach .................. B03C 5/005 204/547 |
| 2009/0014360 | A1* | 1/2009 | Toner ................... B01D 45/12 209/208 |
| 2010/0178666 | A1 | 7/2010 | Leshansky et al. |
| 2011/0223314 | A1* | 9/2011 | Zhang .................. B01J 13/14 427/2.1 |
| 2016/0123858 | A1* | 5/2016 | Kapur ................ G01N 1/4077 435/30 |
| 2016/0339434 | A1 | 11/2016 | Toner et al. |

OTHER PUBLICATIONS

Butler et al., "Observations of shear-induced particle migration for oscillatory flow of a suspension within a tube," Physics of Fluids, 1999, 11(10):2865-2877.
EP Extended European Search Report in European Appln. No. 18809988.1, dated Jan. 26, 2021, 7 pages.
Asmolov, "The inertial lift on a spherical particle in a plane Poiseuille flow at large channel Reynolds number," Fluid Mech., 1999, 381:63-87.
Di Carlo et al. "Continuous inertial focusing, ordering, and separation of particles in microchannels," Proc. Natl. Acad. Sci Nov. 2007, 104(48):18892-18897.
Di Carlo et al., "Equilibrium separation and filtration of particles using differential inertial focusing," Anal. Chem., Mar. 2008, 80(6):2204-2211.
Di Carlo et al., "Particle segregation and dynamics in confined flows," Phys. Rev. Lett., Mar. 2009, 102(9):1-4.
Fachin et al., "Monolithic chip for high-throughput blood cell depletion to sort rare circulating tumor cells," Scientific Reports, Sep. 2017, 7(1):10936, 11 pages.
Gossett et al., "Inertial manipulation and transfer of microparticles across laminar fluid streams," Small, Sep. 2012, 8(17):2757-2764.
Hur et al., "Sheathless inertial cell ordering for extreme throughput flow cytometry," Lab on a Chip, Feb. 2010, 10(3):274-280.
Lee et al., "High-throughput cell cycle synchronization using inertial forces in spiral microchannels," Lab on a Chip, Apr. 2011, 11(7):1359-1367.
Lim et al., "Inertio-elastic focusing of bioparticles in microchannels at high throughput," Nature Communications, Jun. 2014, 5:4120, 9 pages.
Martel et al., "Inertial Focusing in Microfluidics," Annu. Rev. Biomed. Eng., Jul. 2014, 16:371-396.
Matas et al., "Inertial migration of rigid spherical particles in Poiseuille flow," J. Fluid Mech., 2004, 515:171-195.
Melo et al., "Glypican-1 identifies cancer exosomes and detects early pancreatic cancer," Nature, Jul. 2015, 523(7559):177-182.
Miller et al., "Cascading and parallelising curvilinear inertial focusing systems for high volume wide size distribution, separation and concentration of particles," Sci. Rep., Nov. 2016, 6:36386.
Mutlu et al., "Non-equilibrium Inertial Separation Array for High-throughput, Large-volume Blood Fractionation," Sci. Rep., Aug. 2017, 7(1):9915.
Ozkumur et al., "Inertial Focusing for Tumor Antigen-Dependent and-Independent Sorting of Rare Circulating Tumor Cells," Sci. Transl. Med., Apr. 2013, 5(179):179ra47, 20 pages.
PCT International Preliminary Report on Patentability in PCT Appln. No. PCT/US2018/035865, dated Dec. 3, 2019, 8 pages.
PCT International Search Report and Written Opinion in International Appln. No. PCT/US2018/035865, dated Sep. 17, 2018, 13 pages.
Segrè et al., "Radial particle displacements in Poiseuille flow of suspensions," Nature, Jan. 1961, 189(4760):209-210.
Seo et al., "Lateral migration and focusing of microspheres in a microchannel flow of viscoelastic fluids," Physics of Fluids, Jun. 2014, 26(6):063301, 13 pages.
Skog et al., "Glioblastoma microvesicles transport RNA and proteins that promote tumour growth and provide diagnostic biomarkers," Nat. Cell Biol., Dec. 2008, 10(12):1470-1476.
Sollier et al., "Size-selective collection of circulating tumor cells using Vortex technology," Lab on a Chip, Jan. 2014, 14(1):63-77.
Unger et al., "Monolithic Microfabricated Valves and Pumps by Multilayer Soft Lithography," Science, Apr. 2000, 288(7):113-116.
Wang et al., "High-Throughput Inertial Focusing of Micrometer- and Sub-Micrometer-Sized Particles Separation," Oct. 2017, Adv. Sci., 4(10): 1700153, 11 pages.
Warkiani et al., "Ultra-fast, label-free isolation of circulating tumor cells from blood using spiral microfluidics," Nat. Protoc., Jan. 2016, 11(1):134-148.

* cited by examiner

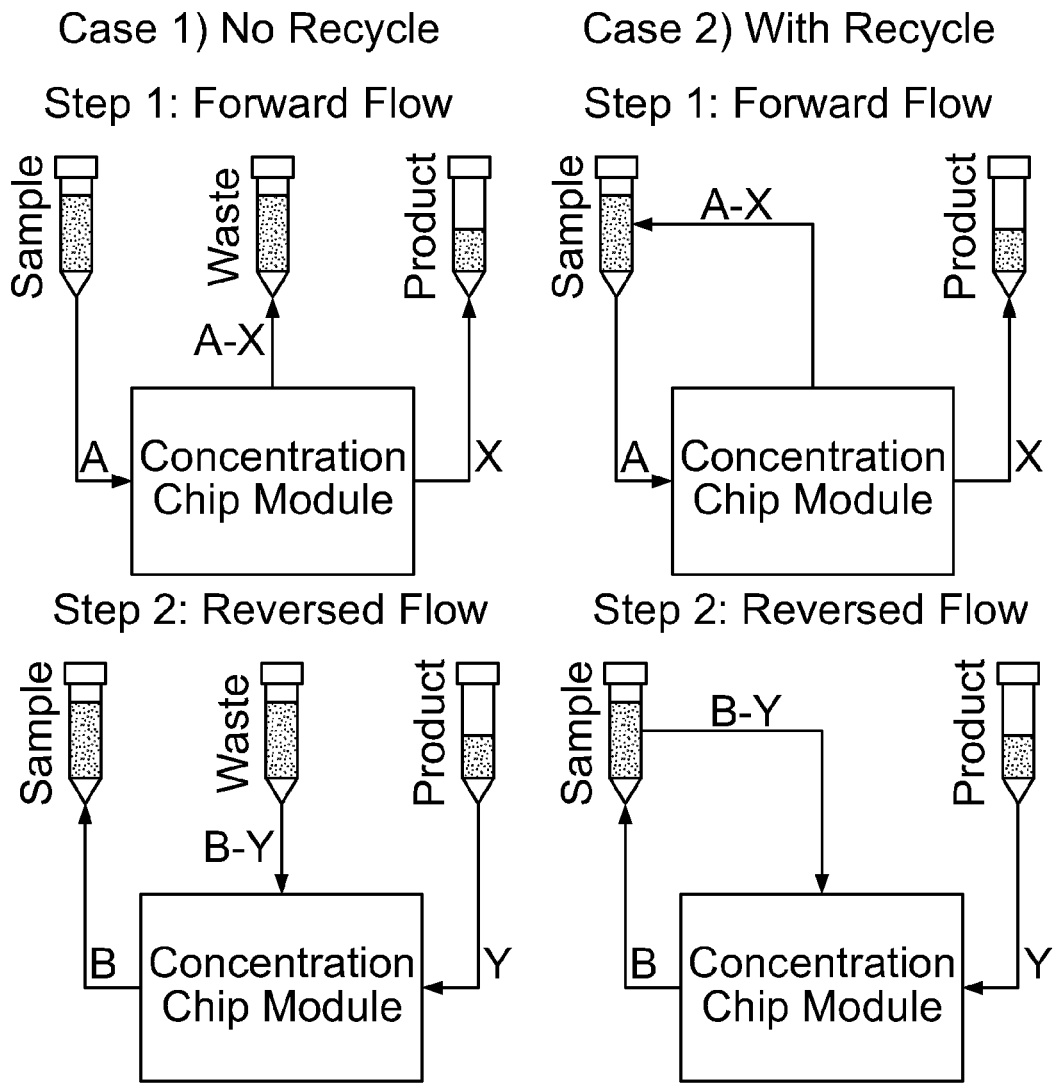
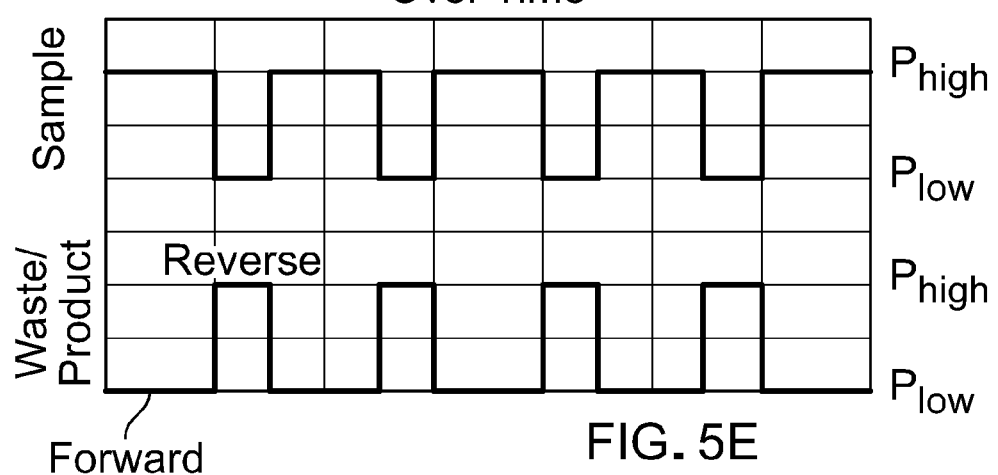
FIG. 5C  FIG. 5D  FIG. 5E

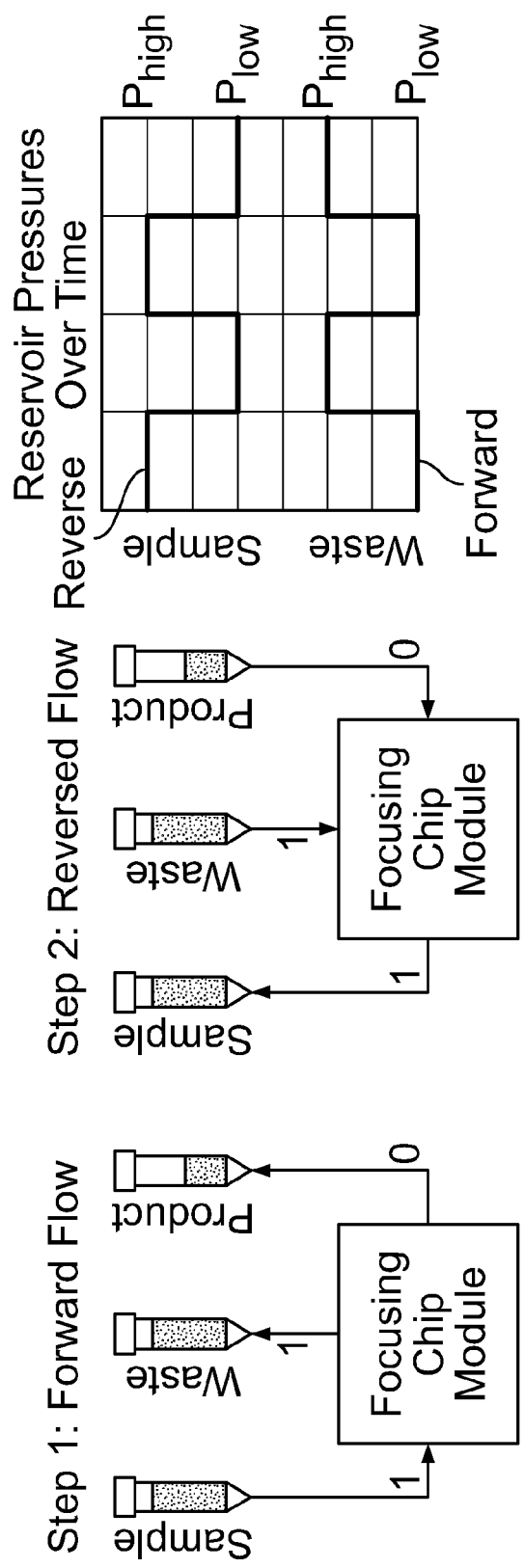
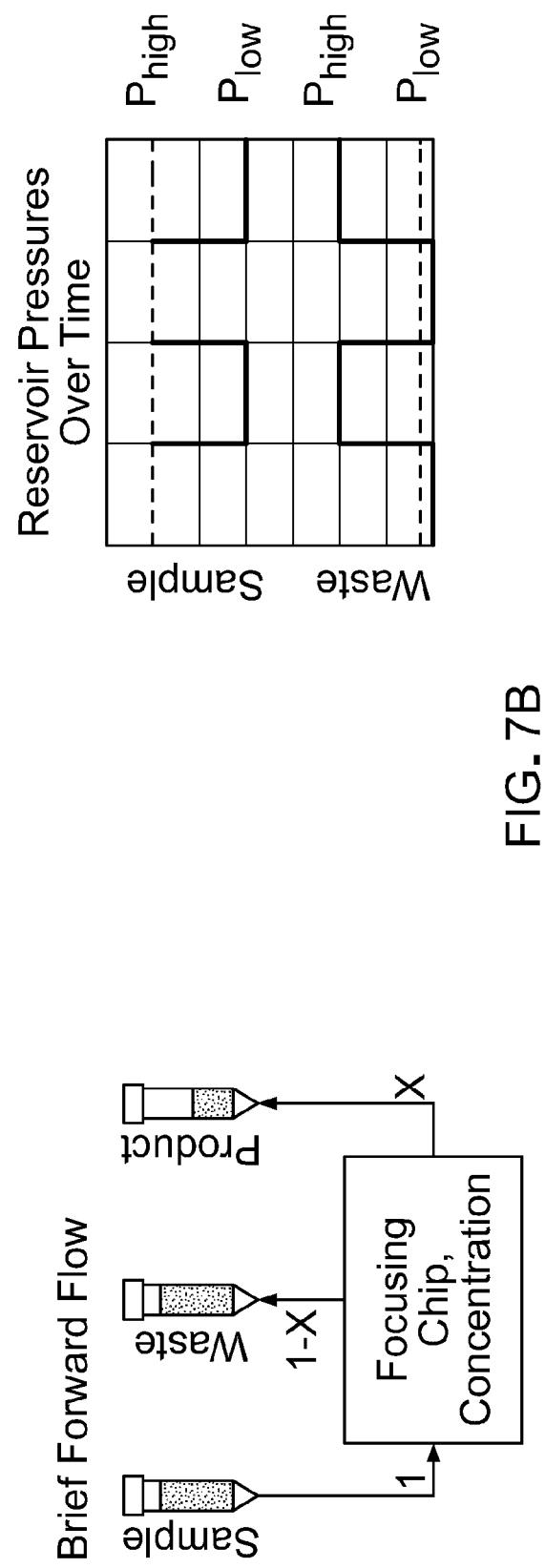
FIG. 7A
FIG. 7B

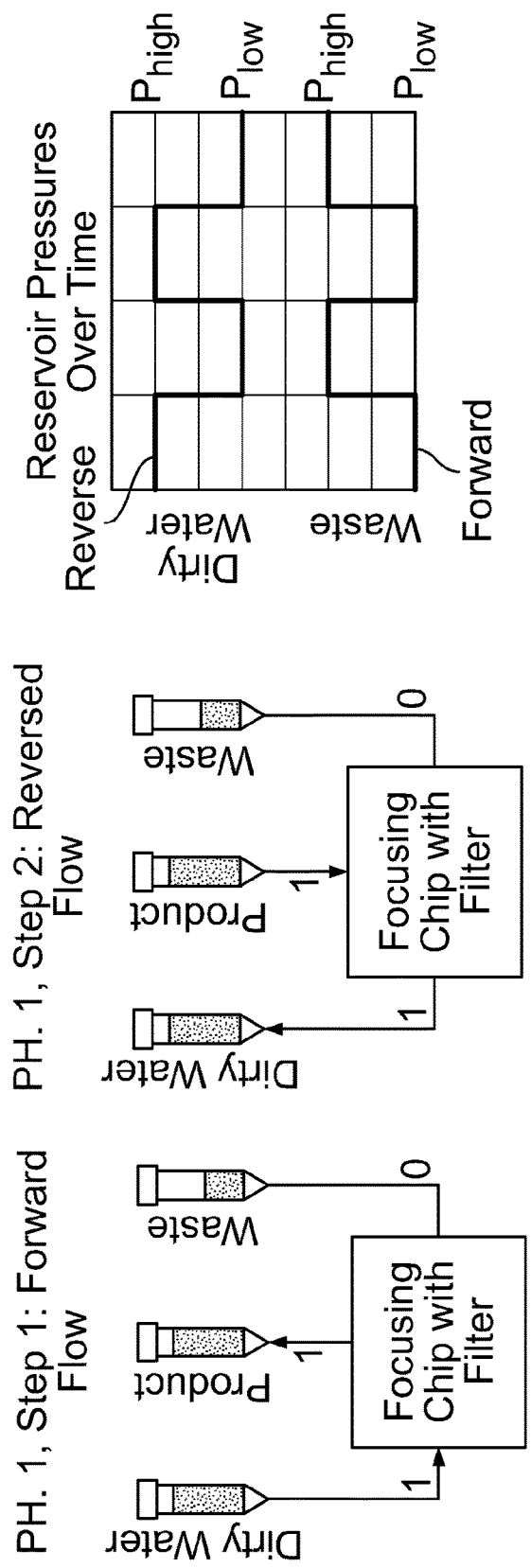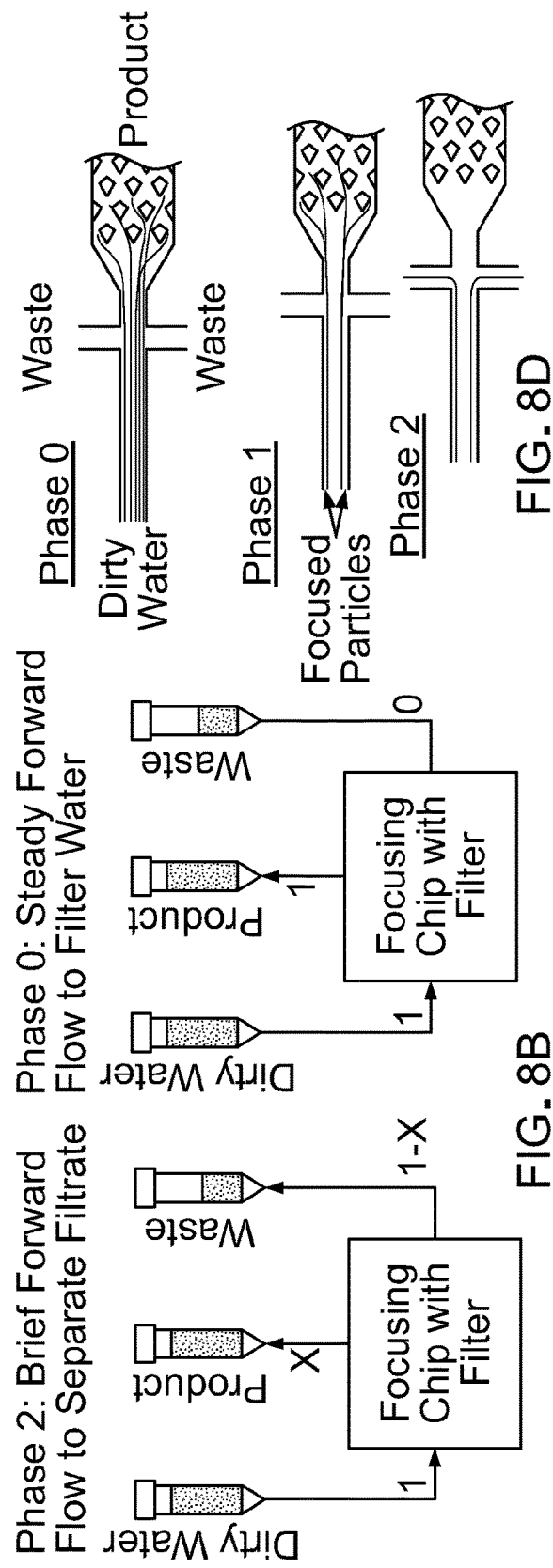
FIG. 8A
FIG. 8B
FIG. 8C
FIG. 8D

OSCILLATORY FOCUSING OF PARTICLES IN CHANNELS

CROSS-REFERENCE TO RELATED APPLICATIONS

This application is a 371 U.S. National Phase Application of PCT/US2018/035865, filed on Jun. 4, 2018, which claims priority to U.S. Provisional Application Ser. No. 62/514,606, filed on Jun. 2, 2017. The entire content of the provisional application is incorporated herein by reference.

STATEMENT AS TO FEDERALLY SPONSORED RESEARCH

This invention was made with Government support under 5P41EB002503-14 and 5U01EB012493-07 awarded by the National Institutes of Health/National Institute of Biomedical Imaging and Bioengineering (NIH/NIBIB). The Government has certain rights in the invention.

TECHNICAL FIELD

This disclosure relates to inertial and viscoelastic microfluidics, and more particularly to focusing of particles in channels, such as microchannels.

BACKGROUND

Inertial microfluidics (i.e., migration and focusing of particles in finite Reynolds number microchannel flows) is a passive, precise, and high-throughput method for microparticle manipulation and sorting. Therefore, it has been utilized in numerous biomedical applications including phenotypic cell screening, blood fractionation, and rare cell isolation. Nonetheless, the applications of this technology have been limited to larger particles such as blood cells, circulating tumor cells, and stem cells; because smaller particles require drastically longer channels for inertial focusing, which increases the pressure requirement and the footprint of the device to the extent that the system becomes unfeasible. Inertial manipulation of smaller particles such as fungi, bacteria, viruses, and other pathogens, or blood components such as platelets and exosomes, is of significant interest.

Inertial microfluidics, which is the manipulation and focusing of particles in microchannels using inertial lift forces, has been employed in several key technologies since it was first demonstrated by Di Carlo et al. in 2007 (Proc. Natl. Acad. Sci., 104(48) (2007)). First observed by Segre and Silberberg with millimeter-scale particles flowing through a large (~1 cm) circular tube (Segré et al., Nature 189 (4760):209-210, 1961), randomly distributed particles laterally migrate to equilibrium focus positions (streamlines) that are pre-determined by the flow characteristics and the channel geometry. This inertial migration enables passive and precise manipulation of particles in microchannels, and has been utilized for aligning, ordering, or separating target cells in blood.

This technology has been used in various biomedical applications, including phenotypic cell screening, blood fractionation, and rare cell (e.g. circulating tumor cells) isolation. For example, Di Carlo et al. used asymmetric curves to achieve differential inertial focusing for separation of larger blood cells (RBCs and WBCs) from platelets (Anal. Chem., 80(6):2204-2211, 2008). Lee et al. used a spiral geometry for size-based separation based on cell cycle and DNA content (Lab Chip 11(7):1359-1367, 2011). Sollier et al. employed sudden expansion channels in combination with Vortex technology, to isolate CTCs from whole blood (Lab Chip 14(1):63-77, 2014). Ozkumur et al. used inertial focusing in a multi-stage circulating tumor cell (CTC) isolation chip to align and order nucleated cells after on-chip debulking of blood, to facilitate magnetic separation of white blood cells from CTCs (Sci. Transl. Med., 5(179): 179ra47, 2013).

Recently, three-dimensional stacking of chips has been explored, which in return significantly improved the throughput of the devices (Warkiani et al., Nat. Protoc., 11(1):134-48 (2016) and Miller et al., Sci. Rep., 6(October): 36386, 2016). Inertial microfluidics have also been used for sheathless alignment of cells for flow cytometry (Hur et al., Lab Chip 10(3):274-280, 2010), size-based separation of white blood cells from lysed blood (Gossett et al., Small, 8(17):2757-2764, 2012) and whole blood fractionation (Mutlu et al., Sci. Rep., 7(1):9915, 2017), and several other applications as summarized in a review by Martel et al (Annu. Rev. Biomed. Eng., 16:371-96, 2014).

Despite the wide breadth of its applications, inertial microfluidics has generally been confined to particles that are a few microns or larger (i.e., not smaller than a red blood cell), because of the strong correlation between the inertial lift forces and the particle size. Smaller particles travelling in typical microchannels (having a cross-sectional dimension of tens of microns) require drastically longer channels for focusing (in the order of meters), increasing the pressure requirement and the footprint of the channel to the extent that the system becomes unfeasible. Inertial manipulation of smaller bioparticles such as fungi, bacteria, and other pathogens, or blood components such as extracellular microvesicles is of significant interest. For instance, identifying the infecting agent in a timely manner is crucial for the treatment of septic patients. Furthermore, recent studies show that exosomes carry information regarding primary tumor, and can help with cancer diagnostics (Skog et al., Nat. Cell Biol., 10(12):1470-6, 2008, and Melo et al., Nature, 523 (7559): 177-182, 2015).

In one study, inertial focusing of 0.92 µm particles was reported in wiggler-shaped microchannels produced from a thermoset polyester (TPE) material (Wang et al., Adv. Sci., 2017, 4, 1700153) to withstand the very high pressures required. One drawback of such high pressures and flow rates is that particles experience significant shear stress, which could be harmful or detrimental to bioparticles and cells. Additionally, higher pressures increase the risk of catastrophic failure, thus adding additional cost for safe operation of the system. As a result, applications of inertial focusing of biological particles have generally been limited to larger biological particles (blood cells, circulating tumor cells, stem cells, etc.).

SUMMARY

This disclosure provides systems and methods to extend the capabilities of inertial and/or viscoelastic focusing in channels, such as microchannels, to smaller particles, lower shear stresses, shorter channels, and lower pressure drops, or any combination thereof. These new systems and methods can be integrated with existing microfluidic devices for inertial and/or viscoelastic manipulation of particles that have defied all prior attempts, enabling a variety of applications in clinical diagnosis including cytometry of micron-scale particles, isolation and characterization of pathogens and extracellular microvesicles, or phenotyping of cancer or stem cells at physiological shear stresses. The particles, e.g., bioparticles and cells, focus into streamlines in the same way and in the same locations as in existing inertial and viscoelastic focusing systems, but at much lower particle Reynolds numbers, much lower shear stress, over much shorter distances and at lower driving pressures and/or flow rates.

In one aspect, the disclosure provides oscillatory fluidic systems for focusing of particles in a fluid sample into one or more streamlines within a fluid flowing in a channel. The systems include a fluid oscillator for alternating a direction of flow of the fluid in a channel; and a controller arranged and configured to transmit control signals to the fluid oscillator to generate a repeating oscillating flow profile of the fluid sample in the channel, wherein the flow profile includes at least one step in a first direction of flow and at least one step in a second direction of flow opposite to the first direction of flow, for a set period of time, thereby focusing the particles into one or more streamlines within the fluid flowing within the channel.

These systems can further include a millimeter or micrometer channel. The dimensions of the channel and the controller can be configured to provide inertial focusing and/or viscoelastic focusing. The viscoelastic focusing occurs when a fluid in the channel is selected to have an appropriate viscosity.

The systems can include a fluid oscillator that includes a source of pressure or flow arranged and controlled to provide an oscillating pressure on, or flow of, the fluid to provide the oscillating flow within the channel. In other implementations, the systems can include a fluid oscillator that includes a source of constant pressure or constant flow arranged and controlled to provide a constant pressure on, or constant flow of, the fluid within the channel and the fluid oscillator further comprises two or more valves arranged along the channel and controlled to provide the oscillating flow within the channel between the two or more valves by directing the constant pressure or flow from the source alternatingly at a first location along the channel and then at a second location along the channel.

In some implementations, the fluid oscillator can further include a signal (pulse) generator and a valve driving circuit, and the two or more valves can be high-speed, three-way valves.

In some implementations, the channel dimensions are configured and the flow rate of the fluid in the channel is controlled such that a Reynolds number within the channel in each direction of flow is from about 0.01 to 2300 ($Re_p$ is also less than 2300, e.g., from about 0.1 to about 100, e.g., 0.01 to 10.0 or 0.01 to 1.0). In some implementations, the Reynolds number within the microfluidic channel in each direction of flow is from about 0.1 to 100. In certain embodiments, the frequency of oscillations is from about 0.01 Hertz to about 100 Hertz.

In some implementations, particles flowing within the fluid move a distance of 1.0 micron to 100 cm in the first direction of flow, and then 1.0 micron to 100 cm in the second direction of flow. For example, the particles flowing within the fluid move a distance of 10 microns to 10 cm in the first direction of flow, and then 10 microns to 10 cm in the second direction of flow. In some embodiments, particles flowing within the fluid move a first distance in one direction a second distance in the opposite direction. For example, the first distance can be the same as the second distance, and thus the particles remain within one location within the channel. Alternatively, the first distance is greater than the second distance, such that the particles move from a first location within the channel to a second location within the channel.

In some implementations, the fluid oscillator is controlled to control the flow of the fluid in the channel to achieve a particle Reynolds number greater than about 0.001. In some embodiments, the hydraulic diameter ($D_h$) of the channel is selected to achieve a ratio of particle diameter a to $D_h$ to be greater than 0.001 and less than 1.0.

In some implementations, the channel comprises a first section having a first hydraulic diameter, a second section in series with the first section and having a second hydraulic diameter smaller than the first hydraulic diameter, and a third section in series with the second section and having a third hydraulic diameter larger than the second hydraulic diameter.

In various implementations, the system is configured to have at least one, e.g., two or more in any combination, of the following parameters: a particle Reynolds number ($Re_p$) greater than about 0.002; a channel Reynolds number (Re) less than about 2300; a channel hydraulic diameter ($D_h$) larger than a particle diameter a; a ratio of particle diameter a to $D_h$ less than about 1; and a Womersley number (Wo) less than about 1.

In another aspect, the disclosure provides methods for focusing of particles in a fluid sample into one or more streamlines within a fluid flowing within a channel. The methods include introducing into a channel a fluid comprising particles to be focused; and controlling a flow rate of the fluid in the channel to generate a repeating oscillating flow profile of the fluid in the channel, wherein the flow profile includes at least one step in a first direction of flow and at least one step in a second direction of flow opposite to the first direction of flow, for a set period of time; thereby focusing the particles into one or more streamlines within the fluid flowing within the channel. The channel can be a millimeter or micrometer channel, and the dimensions of the channel and the flow rate can be configured to provide inertial focusing or viscoelastic focusing when a fluid in the channel is selected to have an appropriate viscosity.

In some embodiments, controlling a flow rate of the fluid includes providing a source of pressure or flow and controlling the source of pressure or flow to provide the oscillating flow within the channel. In other embodiments, controlling the flow rate of the fluid includes providing a source of constant pressure or constant flow to provide a constant pressure on, or constant flow of, the fluid within the channel, and controlling two or more valves arranged along the channel to provide an oscillating flow within the channel between the two or more valves by directing the constant pressure or flow from the source alternatingly at a first location along the channel and then at a second location along the channel.

In some implementations, the channel dimensions are configured and the flow rate of the fluid in the channel is controlled such that a Reynolds number within the channel in each direction of flow is from about 0.01 to 2300, e.g., the Reynolds number within the channel in each direction of flow is from about 0.1 to 100 ($Re_p$ is also less than 2300, e.g., from about 0.1 to about 100, e.g., 0.01 to 10.0 or 0.01 to 1.0).

In some embodiments, the frequency of oscillations is from about 0.01 Hertz to about 100 Hertz, and/or the particles flowing within the fluid move a distance of 1.0 micron to 100 cm in the first direction of flow, and then 1.0 micron to 100 cm in the second direction of flow. For example, the particles flowing within the fluid move a distance of 10 microns to 10 cm in the first direction of flow, and then 10 microns to 10 cm in the second direction of flow.

In some implementations, particles flowing within the fluid move a first distance in one direction a second distance in the opposite direction. For example, the first distance can be the same as the second distance, and thus the particles remain within one location within the channel. Alternatively, the first distance can be greater than the second distance, such that the particles move from a first location within the channel to a second location within the channel.

In some implementations, the fluid oscillator is controlled to control the flow of the fluid in the channel to achieve a particle Reynolds number greater than about 0.001. In some embodiments, the hydraulic diameter ($D_h$) of the channel is selected to achieve a ratio of particle diameter a to $D_h$ to be greater than 0.001 and less than 1.0. In various implementations, the flow rate and channel dimensions are selected and/or controlled to achieve at least one, e.g., two or more in any combination, of the following parameters: a particle Reynolds number ($Re_p$) greater than about 0.002; a channel Reynolds number (Re) less than about 2300; a channel hydraulic diameter ($D_h$) larger than a particle diameter a; a ratio of particle diameter a to $D_h$ less than about 1; and a Womersley number (Wo) less than about 1.

The new systems and methods can be used to achieve inertial focusing in practically "infinite channels," allowing focusing of submicron-scale (i.e., hundreds of nanometers) particles. The new systems and methods enable the manipulation of particles at extremely low particle Reynolds number ($Re_p<0.005$), flows that are otherwise unattainable by steady-flow inertial microfluidics (which has been limited to $Re_p>$about 0.1). Using these techniques, particles as small as about 500 nm can be inertially focused.

As used herein a millimeter channel, has internal dimensions on the order of millimeters, e.g., 1, 2, 3, 4, 5, 6, 7, 8, 9, 10, or more millimeters in height and/or width. As used herein a micrometer channel, has internal dimensions on the order of micrometers, e.g., 1, 2, 3, 4, 5, 6, 7, 8, 9, 10, 15, 20, 30, 40, 50, 60, 70, 80, 90, 100, 250, 500, 750, or more micrometers in height and/or width.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the disclosure are set forth in the accompanying drawings and the description below. Other features and advantages of the disclosure will be apparent from the following detailed description, and from the claims.

DESCRIPTION OF DRAWINGS

FIGS. 5C and 5D are schematic diagrams showing the inputs and outputs for the concentration chip modules of FIGS. 5A and 5B.

FIG. 5E is a graph of sample and waste/product streams and reservoir pressure over time.

FIG. 7A is a pair of schematic diagrams showing the inputs and outputs for a focusing chip modules used in intermittent flow for focusing a product using oscillatory flow, in forward and reverse flow, respectively, and a graph of sample and waste streams and reservoir pressure over time.

FIG. 7B is a schematic diagram showing the inputs and outputs for a focusing chip module used in intermittent flow for concentrating a product using steady flow, and a graph of sample and waste streams and reservoir pressure over time.

FIG. 8A is a pair of schematic diagrams showing the inputs and outputs for a focusing chip module with a filter used in intermittent flow for cleaning the filter using oscillatory flow, in forward and reverse flow, respectively.

FIG. 8B is a pair of schematic diagrams showing the inputs and outputs for a focusing chip module with a filter used in intermittent flow to purge the filtrate and for steady water filtration, in a brief forward flow and a steady forward flow, respectively.

FIG. 8C is a graph of dirty water and waste streams and reservoir pressures over time.

FIG. 8D is a schematic of flows of dirty water and focused particles in Phases 0, 1, and 2 in a filter module.

Like reference symbols in the various drawings indicate like elements.

DETAILED DESCRIPTION

The current disclosure describes systems and methods that apply oscillatory (or "alternating current" (AC)) flow to inertial and/or viscoelastic focusing in small channels such as millimeter- and micro-channels. These two passive particle manipulation modes are widely used in microfluidics, albeit always in a steady flow (or "direct current" (DC)) configuration. For inertial focusing and viscoelastic focusing, the present new systems and methods extend the residence times of suspended particles to infinity, in theory (when the particles in a fluid sample continue to move back and forth within a microfluidic channel without moving from one location), essentially removing the practical limits on channel length.

The new systems and methods directly push back the barriers to focusing small particles by orders of magnitude in pressure drop, shear stress, and ease of fabrication. In particular, given the ability to focus smaller particles more easily using inertial and/or viscoelastic forces, the new systems and methods enable expansion of inertial and viscoelastic microfluidic technology into manipulation of bacteria and even viruses, while at the same time improving the tolerability of the process by larger, but especially sensitive, cells that might currently suffer damage during transit, such as mammalian cells.

The new systems and methods can be used for concentrating very small particles or cells (such as bacteria, yeast, exosomes, nanoparticles, or viruses), using very short and small channels (such as nanofluidic systems), and very small driving pressures. They also widen the types of mammalian cells that tolerate inertial and viscoelastic focusing due to substantially reduced shear stresses. Moreover, all of the standard applications for inertial or viscoelastic focusing would incur benefits. These applications include sorting, separation, concentration, sheathless flow cytometry, controlled encapsulation by inertial ordering, etc. Within the biotech industry, inertial and viscoelastic focusing could also be combined with on-chip assays due to the dramatic shrinking of the required footprint and ability to increase residence times on-chip nearly without bound (including assays on cellular responses to shear stress, controlled addition/removal of chemicals to cells, etc.).

General Methodology

Using oscillatory microfluidics, inertial focusing in practically infinite channels can be achieved, allowing for particle focusing at the micron-scale and even smaller. Unlike traditional steady-flow microfluidics, oscillatory microfluidics switches the direction of the flow at a frequency high enough to avoid cells and particles traveling further than the whole device in a single step, but low enough that cells or particles spend sufficient time in a fully-developed flow regime where focusing occurs and is understood.

Figure 1A:
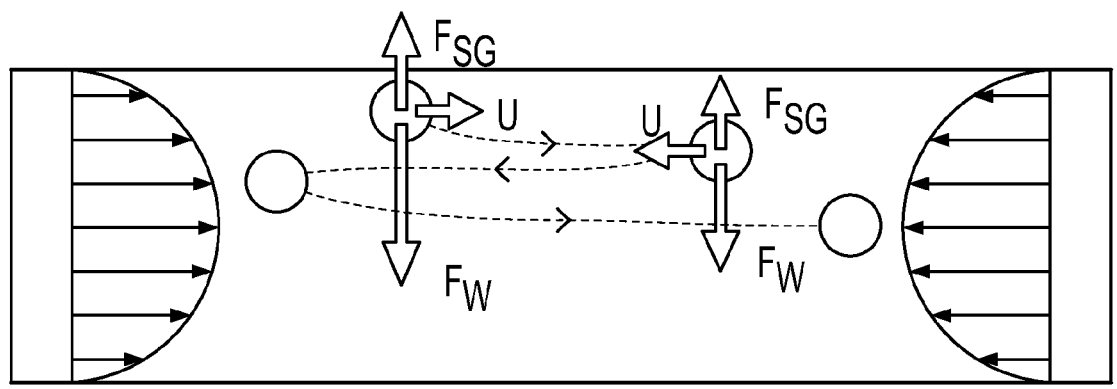
FIG. 1A is a schematic diagram of oscillatory inertial microfluidics theory showing that inertial lift forces ($F_W$ and $F_{SG}$) preserve their directionality when the velocity field is reversed, enabling indefinite extension of the inertial focus length. It is also true that the directionality of lift forces remain the same when reversing the direction of fluid motion in viscoelastic focusing as well, such that oscillatory viscoelastic focusing is also possible as described herein.

Due to the symmetry of the velocity field along the flow axis, the inertial lift forces acting on the particle preserve their directionality when the flow direction is switched (FIG. 1A). By exploiting this symmetry, the focusing length can be extended indefinitely, even though the channel itself has a short, fixed length. This method enables manipulation and focusing of small particles at extremely low particle Reynolds number ($Re_p$<<0.1) flows, which are otherwise unattainable by inertial microfluidics. In addition, shorter channel length decreases the input pressure, which is a practical limiting factor that can cause the device features to deform or break. Operation at extremely low $Re_p$ regime also enables lower flow velocities in channels with larger cross-sections, which reduces the shear stress experienced by the particles in the channel, allowing cell focusing at physiological conditions.

Figure 1B:
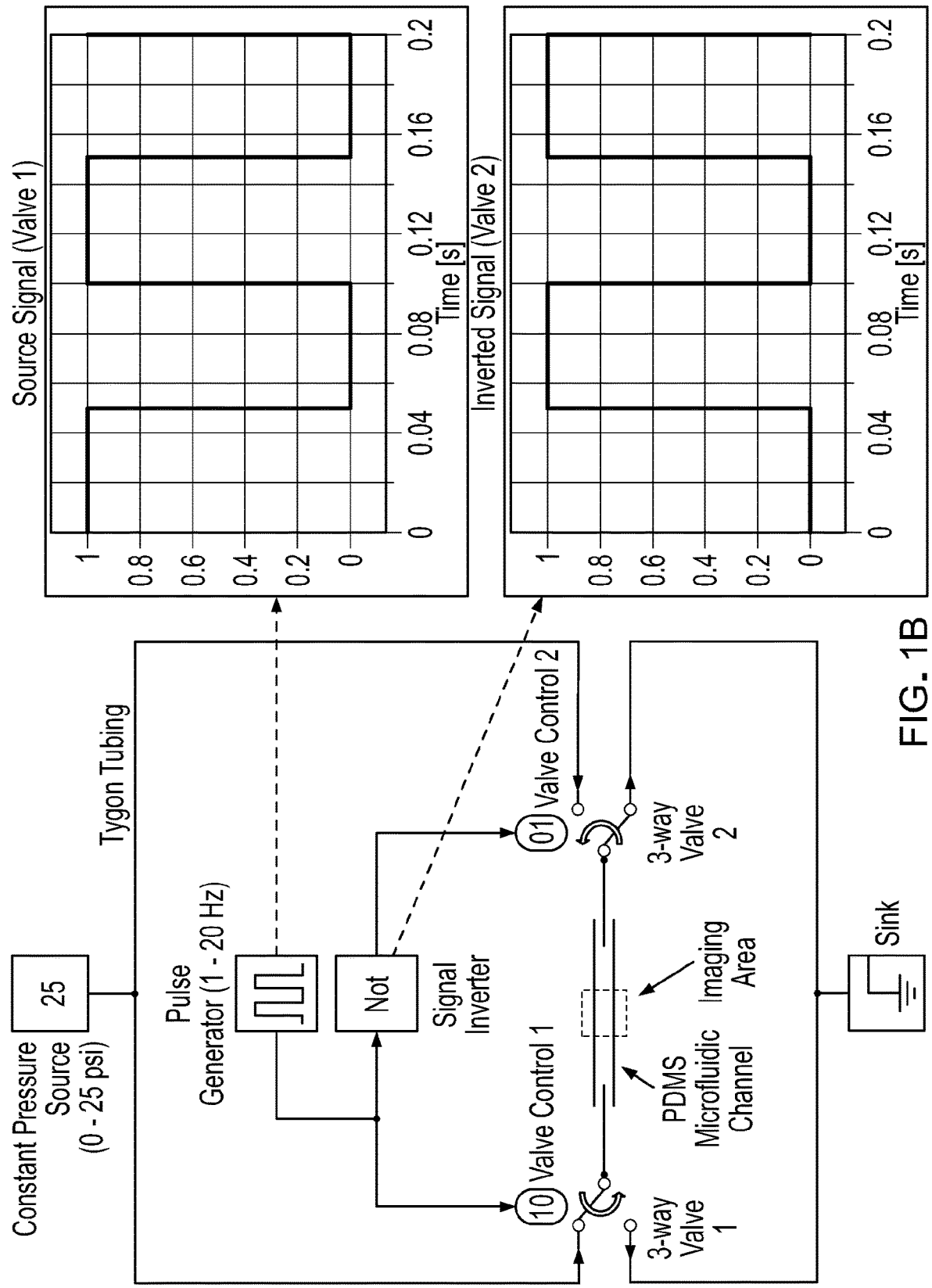
FIG. 1B is a design schematic of the oscillatory microfluidics systems used for oscillatory inertial focusing.

A general schematic of an oscillatory microfluidic system that can be used to carry out inertial or viscoelastic focusing of particles into one or more streamlines within a fluid sample is shown in FIG. 1B. The system includes a fluid oscillator for alternating a direction of flow of the fluid sample through the microchannel, e.g., a symmetric or asymmetric microchannel; and a controller that transmits control signals to the fluid oscillator to control the flow of the fluid sample in the microchannel to be in a first direction at a set flow rate, to change the first direction of flow to a second direction of flow opposite to the first direction of flow and at a set flow rate, and to oscillate the direction of flow between the first direction of flow and the second direction of flow at a set frequency and for a set period of time, thereby focusing the particles within one or more streamlines within the fluid sample flowing within the microfluidic channel.

In specific examples, the systems can include a pressure source, such as a pump, which can be a constant or varying pressure source, and a signal (pulse) generator, a valve driving circuit, and two high-speed valves, such as three-way valves (FIG. 1B).

As shown in FIG. 1B, a constant pressure source, e.g., 0-25 psi, can be connected to 3-way valves at opposite ends of a microfluidic channel, e.g., made of polydimethylsiloxane (PDMS) or other plastics, metal, ceramic, or glass. The fluid sample and other liquids travel through conduits to and from the microfluidic channel through plastic tubing, e.g., made of Tygon®. The pulse generator, e.g., 1 to 20 Hz, controls the valves via valve control 1 and 2 according to the source signal (valve 1) or inverted signal (valve 2) to provide the oscillatory flow within the microfluidic channel. Output and/or waste of the system (sink) is not pressurized in the depicted configuration, but can be if desired. Imaging is done in the imaging area shown in FIG. 1B.

As shown in the Examples below, inertial focusing can be achieved at $Re_p$ at least as low as 0.005 when using the oscillatory flow methods described herein, about 20 times lower than previously attained, and synthetic particles as small as 500 nm can be focused.

In summary, oscillatory inertial microfluidics achieves inertial particle manipulation and focusing in a previously inaccessible flow regime, specifically at a very low $Re_p$ range ($Re_p<0.01$) and particle-to-channel ratios ($a/H<0.1$). We demonstrated this by inertially focusing a variety of particles—as small as 500 nm—in oscillatory flows, including a bacterium (*Staphylococcus aureus*) in an 80 μm wide microchannel using 20 psi driving pressure, which corresponded to Rep=0.0047 and a/H=0.01. After demonstration of the method, we described the key principles for the design and operation of microfluidic devices at this flow regime, based on experimental observations and a non-dimensional analysis of inertial migration.

The new systems can enable a new generation of inertial microfluidic devices, which are unfeasible to implement using traditional, steady flow microfluidics. While an analytical system was used in this study to be able to investigate a wide range of parameters (in terms of particle size, particle-to-channel ratio, and the dimensionless parameter Rep), purpose-built systems would be required to evaluate the performance of the proposed method for specific applications. These applications include inertial manipulation of smaller bioparticles such as bacteria, for the development of isolation devices based on label-free sorting of the pathogens. Larger bioparticles such as nucleated cells (e.g., circulating tumor cells, white blood cells) can be sorted at physiological shear stresses to ensure that the cells are not damaged or exhibit any flow-induced response, and also be repeatedly imaged on their focus plane while rotating for biophysical characterization or high sensitivity flow cytometry applications. We also expect that the very low particle-to-channel ratio can potentially extend the capabilities of inertial microfluidics to allow the use of easy-to-manufacture, millimeter-scale devices (e.g., manufactured via 3D printing) for cell and bioparticle processing, also at much lower shear stress.

Theoretical Background

Physics of inertial microfluidics, i.e., the forces that cause the lateral migration and eventual focusing of particles in microchannels are well studied. The major practical challenge for inertial microfluidics in very low $Re_p$ flows is the extensive channel lengths required to attain focusing. To see this, consider first that the migration velocity of the particle due to inertial lift ($U_P$) can be calculated for a point particle as (assuming that the Stokes drag is balancing the inertial lift force):

$$U_P = f_L \rho U_m^2 a^3 / 3\pi\mu H^2 \quad [1]$$

where $f_L$ is a dimensionless lift coefficient, ρ is the density of the carrier fluid, $U_m$ is the mean flow velocity in the channel, a is the particle diameter, μ is the viscosity of the carrier fluid and H is the cross-sectional channel dimension of interest. Di Carlo has calculated an estimated theoretical length which is required for inertial focusing, based on the $U_P$ and the lateral migration length (of order H), for finite particles. Adapting the same method to point particles using equation [1], a similar expression can be obtained for the required channel length for focusing ($L_f$) as:

$$L_{f,theoretical} = \pi\mu H^3 / f_L \rho U_m a^3 \quad [2]$$

From this relationship, it is apparent that the required length is inversely correlated with $U_m$ and $a^3$ (compared to $U_m$ and $a^2$ for finite particles). Regardless of the point or finite particle assumption, the required length and the pressure requirement of the system increases drastically with decreasing $Re_p$, making it impractical.

In a straight channel with rectangular cross-section (i.e., no Dean flow), a particle is subjected to two inertial lift forces ($F_L$): wall lift force ($F_W$) and shear gradient force ($F_{SG}$) (see FIG. 1A)(Di Carlo, Lab Chip, 9(21):3038-3046, 2009). The combination of these forces is often represented by: $F_L = f_L \rho U_m^2 a^x / H^y$, where $f_L$ is a dimensionless lift coefficient (which has a typical range of 0.02-0.05), ρ is the density of the carrier fluid, $U_m$ is the mean flow velocity in the channel, a is the particle diameter and H is the channel dimension of interest (width or height). If a point particle assumption is made (i.e., particle does not disturb the flow, a<<H), then the exponents of a and H are found to be: x=4 and y=2 for the entire channel (Matas et al., J. Fluid Mech., 515:171-195, 2004, and Asmolov, J. Fluid Mech., 381:63-87, 1999).

More recent experimental measurements with finite particles (0.05<a/H<0.2) revealed that based on the lateral position of the particle in the channel, a better fit for $F_L$ can be obtained using: x=3 and y=1 near channel centerline, and x=6 and y=4 near the wall region (Di Carlo et al., Phys. Rev. Lett., 102(9):1-4, 2009). Nonetheless, for both point and finite particle assumptions, $F_L$ is strongly correlated with the particle size (a) and flow velocity ($U_m$). Particle Reynolds number ($Re_p$) is a dimensionless number conventionally used to characterize inertial microfluidic systems, which encompasses both a and $U_m$: $Re_p = \rho U_m a^2/(\mu D_h)$, where μ is the viscosity of the carrier fluid and $D_h$ is the hydraulic diameter of the (rectangular) channel: $D_h = 2WH/(W+H)$, where W is the cross-sectional dimension other than H.

Based on the dimensionless number regimes such as the channel Reynolds number (Re or $Re_{ch}$), particle Reynolds number ($Re_p$), or the ratio of particle diameter α to the hydraulic diameter of a microchannel $D_h$ ($a/D_h$), we can define the frequency and also the travel distances in a given system. The frequency of the oscillations is limited in the lower end by the distance they travel. In particular, the travel distance should not exceed the total length of the microfluidic channel in the microchip. Thus, the frequency and travel distance is correlated. In the higher end, the oscillation frequency is limited by the entrance length (the length required for the flow to develop). For laminar flow, this is quantified by the standard dimensionless Womersley number (Wo):

$$Wo = D_h(2*\pi*f*\rho/\mu)^{1/2}$$

where $D_h$ is the hydraulic diameter, f is frequency (Hz), ρ is density, and μ is dynamic viscosity. Small Wo (<1.0), e.g., 0.1, 0.2, 0.3, 0.4, 0.5, 0.6, 0.7, 0.8, 0.9, or 0.95 means entrance length effects can be ignored, which means the flow is fully developed for almost all of the oscillation.

In general, the streamline positions achieved by the new oscillatory flow methods are the same as for steady flows. For example, in square channels, the particles will follow four streamlines, one centered along each of the four walls. In rectangular channels, one obtains two streamlines, one along each of the long walls, centered on that wall. In inertial fractionator systems, which can be systems with square or rectangular channels, the separation results in displacement from one channel to another.

In curving channels, there will be two streamlines along the center offset (2 on top of each other). For example, the disclosure includes methods for focusing particles in a moving fluid by providing particles suspended in a moving fluid into a channel, wherein the channel is curved and has a rectangular cross-section, a height, a width, and a hydraulic diameter equal to 2*height*width/(width+height); and flowing the fluid through the channel under conditions such that inertial forces acting on the particles result in the localization of a flux of particles in the channel, wherein a lift/drag ratio for the particles is greater or equal to one over a limited region of the channel cross section and the magnitude of the forces is large enough to create focusing of the flux of particles to one or more streams that are localized to within an area having a width of, at most, five times the width of the particles in one dimension.

For discussions of inertial focusing, see, e.g., U.S. Pat. Nos. 9,808,803; 9,895,694; and 9,610,582; and US Published Patent Application No. US2016/0123858. All of these references are incorporated herein by reference in their entireties, including their figures and claims.

Viscoelastic focusing results in focusing to corner positions and center streams in square/rectangular channels, and the center stream is displaced from the centerline as a function of curvature in curving channels. The corner positions may not be present when particles are too big to fit. Viscoelastic effects exist when the Weissenberg number is greater than zero (Wi=λU/H, where λ is characteristic relaxation time, U is mean channel velocity, and H is the narrowest channel dimension). In a square channel, the focusing positions include the channel centerline and close to the four corners, however, as particle size increases only the center stream is accessible. The time required to focus particles does depend on particle diameter, but for oscillatory flow, a need for long duration of flow does not prevent successful focusing. Therefore, successful focusing is possible by viscoelastic effects when Weissenberg number is greater than zero.

The elasticity number, defined as El=Wi/Re, allows the relative effects of viscoelastic and inertial focusing fluid forces to be compared. When El<<1, inertial focusing dominates, along with the characteristic focus positions, but when El>>1, viscoelastic focusing dominates, revealing separate focus positions. When El~1, inertia-elastic focusing occurs, whereby the focus positions of particles are modified rather than switching from one set to the other set. For example, the corner positions that are often present in viscoelastic focusing can be eliminated, while the center focus position remains precisely focused. This can persist to quite high Reynolds numbers, even exceeding the textbook limit for onset of turbulence.

For discussions of viscoelastic focusing, see, e.g. US Published Patent Application No. 2016/0339434; Lim et al., "Inertio-elastic focusing of bioparticles in microchannels at high throughput," Nature Communications, 5:4120 (2014); and Seo et al., "Lateral migration and focusing of microspheres in a microchannel flow of viscoelastic fluids," Physics of Fluids, 26:063301 (2014). All of these references are incorporated herein by reference in their entireties, including the figures and claims.

Oscillatory Inertial Focusing Systems

Figure 2:
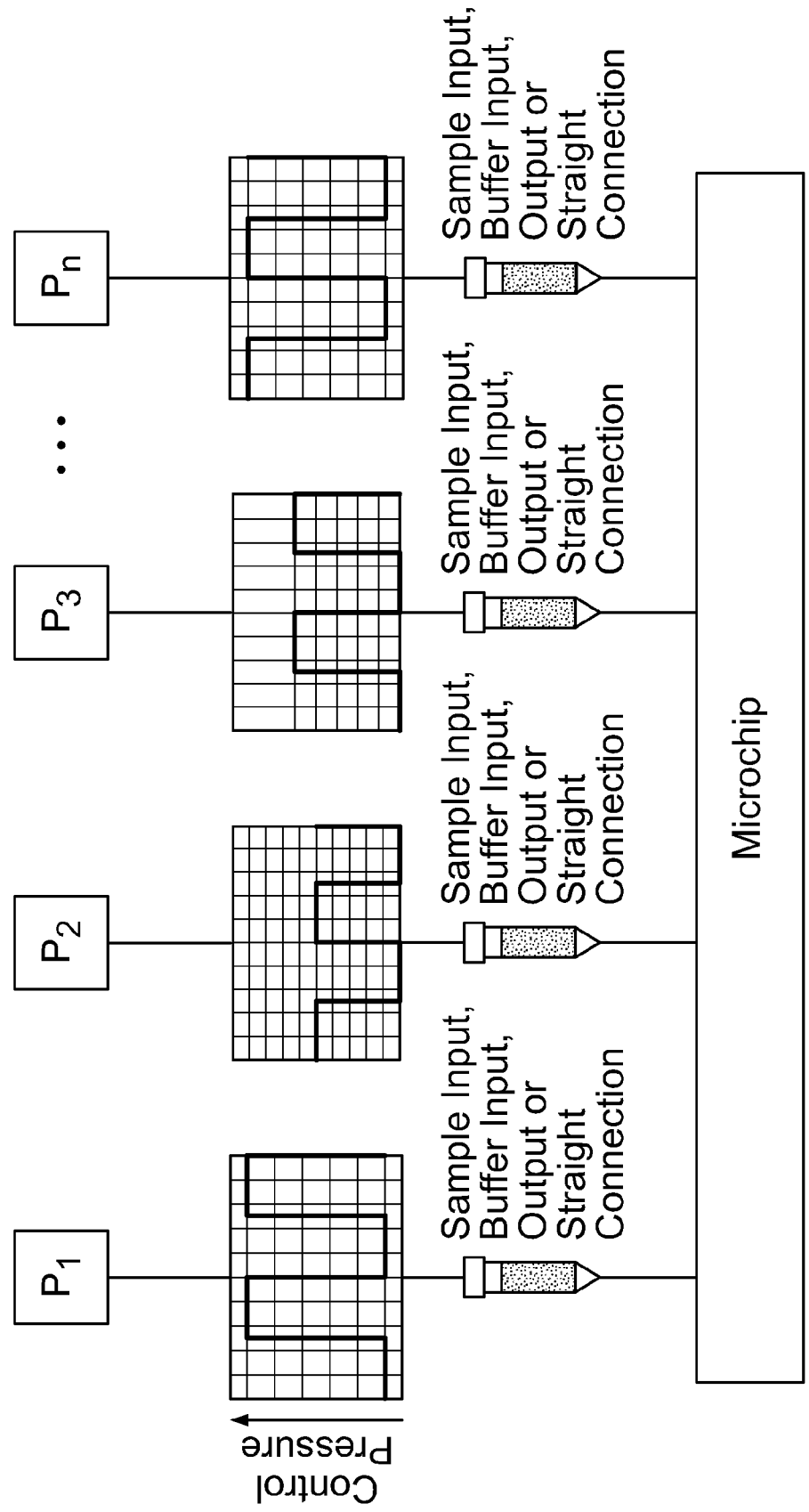
FIG. 2 is a schematic diagram of a control method and microchip for oscillatory inertial focusing, in which input pressures or flows are controlled according to a pressure or flow control signal.

FIG. 2 shows a schematic of a microchip and several inputs and outputs along with a controlled pressure or controlled flow source used in a method in which the input pressure or flow is controlled to oscillate. In this method, a system creates flow fields on the microchip by controlling the pressure or flow sources. If a pressure source is used, the outlet pressure of all the pressure sources can (i) alternate between a high and low state at a set frequency, (ii) transition between a high and low state in a gradual manner (similar to a sine wave), or (iii) have a predefined profile which will change the pressurization of a fluid in a container. Based on the combination of these pressure profiles from n different pressure sources, oscillation of the fluid in the microchip is achieved. If a flow source is used, the flow-rate can (i) alternate between a high and low state at a set frequency, (ii) transition between a high and low state in a gradual manner (similar to a sine wave), or (iii) have a predefined profile which will result in a set flow-rate (net in, net out, or zero) of the fluid container. The combination of the pressure of flow-rate profiles will be used to oscillate the flow field in the entirety or only part of the microfluidic channel, continuously or intermittently, with or without a net resulting flow. Any n number of pressure or flow sources can be used in combination to achieve the desired flow field on the microchip.

Figure 3:
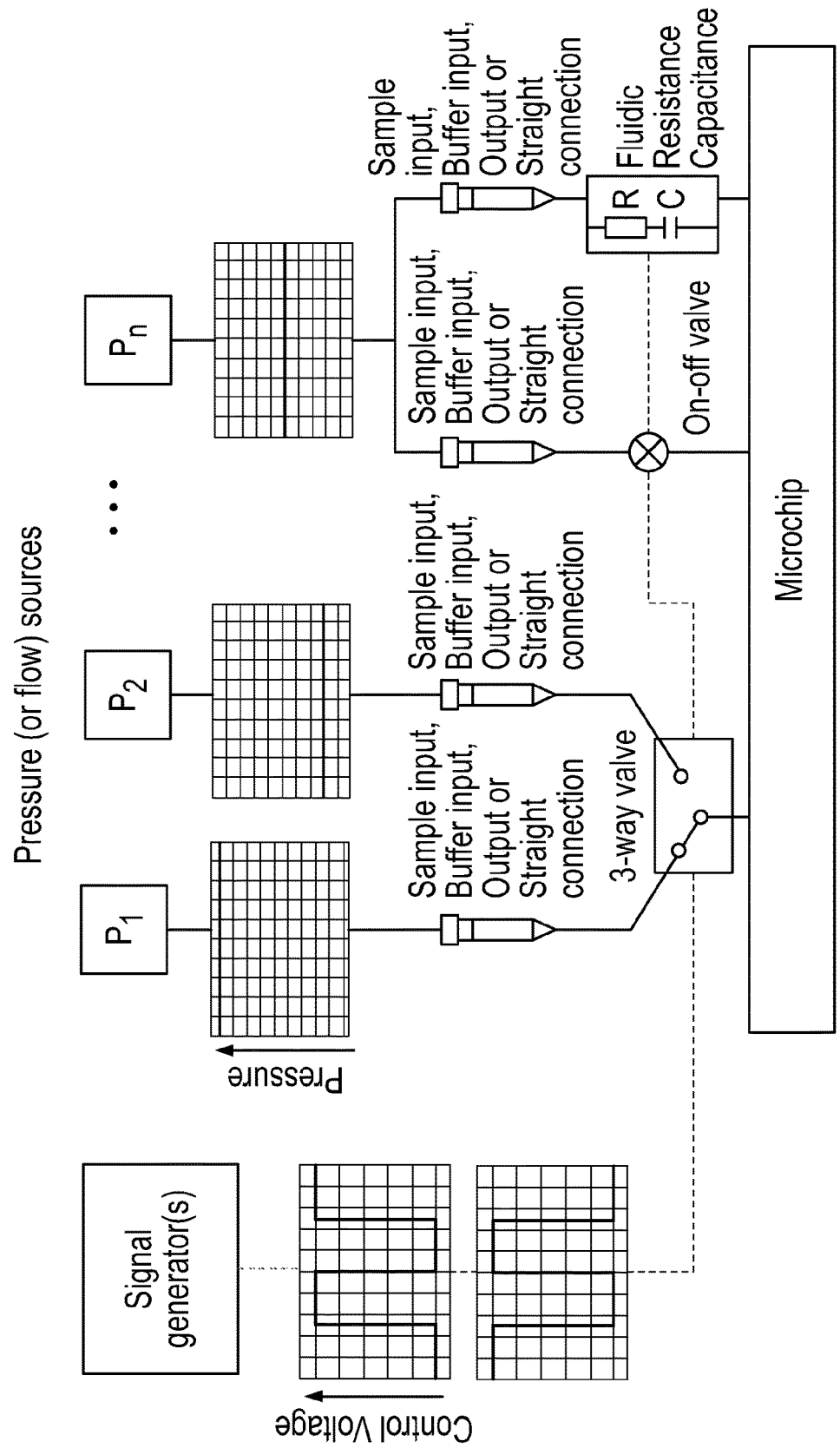
FIG. 3 is a schematic diagram of a control method and microchip for oscillatory inertial focusing, in which input pressure or flow is steady and valves and/or fluid resistance/capacitance (RC) components external to the microchip are controlled to cycle the input pressure or flow according to inputs from a signal generator.

FIG. 3 shows a system and method similar to that shown in FIG. 2, but in this method the input pressure or flow is controlled to be steady and valves and/or fluidic resistance and/or capacitance components are controlled to oscillate the flow. In this method, a system creates flow fields on the microchip by controlling valves or other fluidic control components between pressure or flow driven fluid samples and the microchip. Valves can be three-way valves, on-off valves, or other fluid control components that can be externally controlled via an electrical, hydraulic, pneumatic, or other signal. In addition to valves, transient-response fluidic components such as a combination of fluidic resistances and fluidic capacitances can be used to obtain a set time dependent response of the fluid flow. Resistances can be created by long tubing with small hydraulic diameters. Capacitances can be created by elastic tubing components that will swell with pressure, fluid reservoirs with a preset capacity that will fill until a limit, or other methods. Any n number of steady or transient fluid flow control components will be used to oscillate the flow field in the entirety or only part of the microfluidic channel, continuously or intermittently, with or without a net resulting flow.

Figure 4:
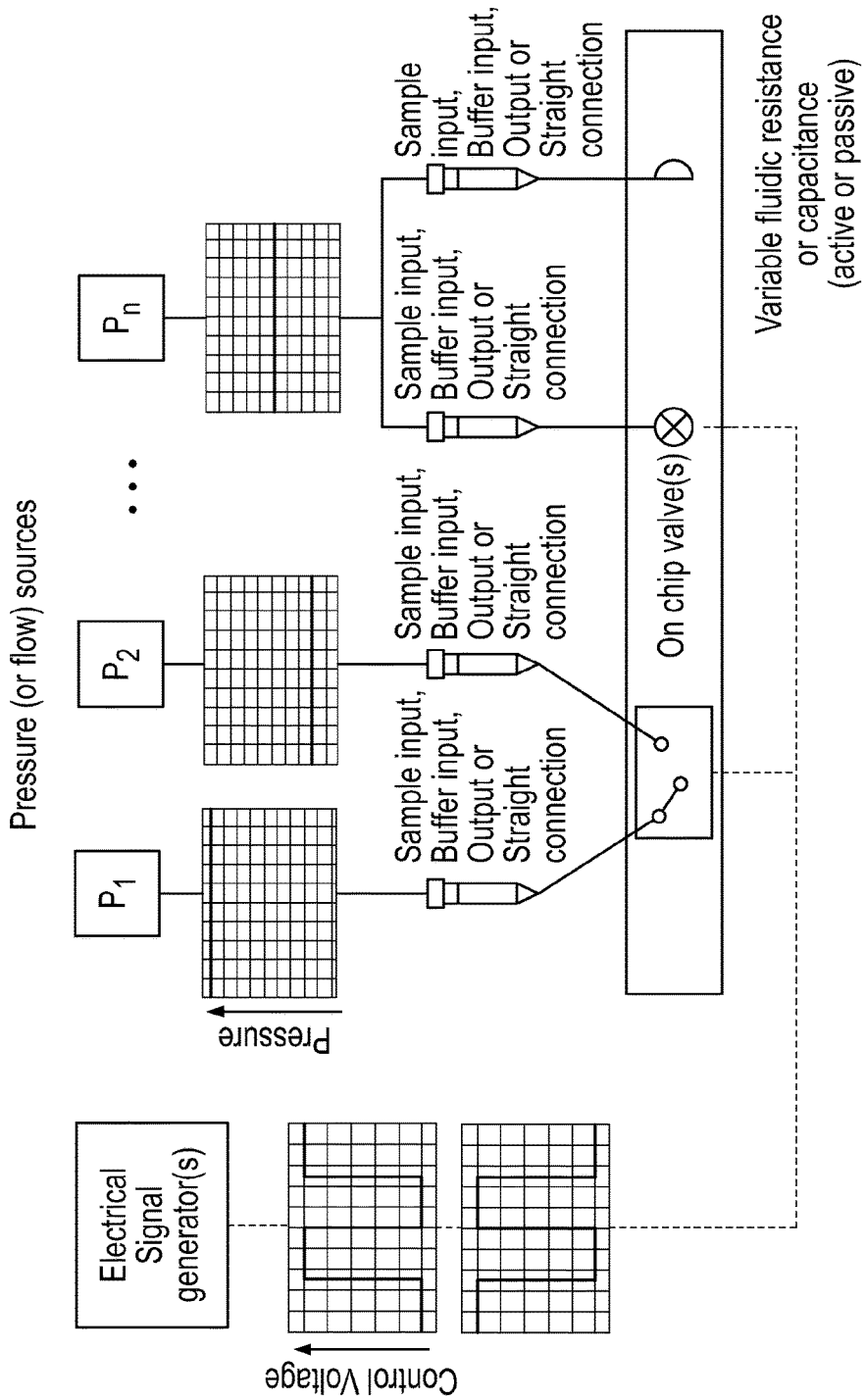
FIG. 4 is a schematic diagram of a control method and microchip for oscillatory inertial focusing, in which input pressure or flow is steady and integrated valves and/or fluid resistance/capacitance (RC) components that are located within the microchip are controlled to cycle the input pressure or flow according to inputs from a signal generator.

FIG. 4 shows a system and method similar to that shown in FIGS. 2 and 3, but in this method the input pressure or flow is controlled to be steady and valves and/or fluidic resistance and/or capacitance components integrated on the microchip are controlled to oscillate the flow. In this method, a system creates flow fields on the microchip by controlling microfluidic valves or other fluidic components integrated on a microchip, e.g., a PDMS microchip. Microfluidic valves can be three-way valves, on-off valves, or other fluid control components that can be externally controlled via an electrical, hydraulic, pneumatic, or other signal. Some of these on-chip valves rely on the deformation of PDMS layers under pressure, such as the quake valves developed at Stanford (see, e.g., Unger et al, "Monolithic Microfabricated Valves and Pumps by Multilayer Soft Lithography," Science, 288(7):113-116, April 2000).

Instead of on-chip valves, transient fluidic components such as fluidic resistances and capacitances can be used to obtain a set time dependent response of the fluid flow. Resistances on the microchip are created by long channels with small hydraulic diameters. Capacitances on the microchip can be created by a large deformable section that will swell with pressure, or introducing a bubble of vapor, gas, or a mixture of gases (such as air) that will enlarge or shrink with pressure. Any n number of steady or transient on chip fluid flow control components will be used to oscillate the flow field in the entirety or only part of the microfluidic channel, continuously or intermittently, with or without a net resulting flow.

Any one or more of the control mechanisms outlined in FIGS. 2-4 can be combined with each other and in general, description of one method of controlling the oscillatory flow does not preclude the ability to combine it with one or more other described modes of flow actuation (such as reciprocating machinery).

System Throughput

In an oscillatory inertial microfluidics system, the physical length of the channel is shorter (with respect to traditional steady flow) and is virtually extended by making the particles spend more time in the channel. This, in turn, reduces the throughput per channel proportionally with the extended time. For instance, if the inertial focusing length is extended an order of magnitude via oscillatory flow, it is expected that the throughput of the system will decrease an order of magnitude, if no other changes are made to the system.

We propose that this reduction in the single channel throughput can be alleviated by increased parallelization of the channels. Due to the shorter channel length, it is possible to fit more devices in the same overall footprint, which enhances parallelization and scaling. For instance, if the inertial focusing length is extended ten-fold via oscillatory flow, ten times the number of channels could be fitted in the same geometry instead of an equivalent, ten-fold longer channel. In addition, in the oscillatory case, the pressure drop would be significantly less due to the shorter channel length. It should be noted that while the higher parallelization would bring additional engineering design challenges, the feasibility of highly parallelized microfluidic chips on injection-molded plastic devices has been successfully demonstrated (see, e.g., Lim et al., Nature Communications 5, 4120 (2014) and Fachin et al., Scientific Reports, 7(1), 10936, 2017).

Applications of Oscillatory Inertial Focusing

The new oscillatory inertial focusing techniques can be used in a variety of existing inertial focusing systems and for a variety of tasks.

Concentration by Pressure Control and Forward Flow Bias

FIGS. 5A to 5E relate to systems and methods to concentrate particles in a fluid sample. Focusing of particles into specific streamlines can be used to concentrate focused particles when those streamlines are sorted into a "product" outlet in a fluidic circuit by means of controlled output flows. For example, a straight channel or "dog-bone" separator (FIG. 5A) operates by first oscillating the flow to induce focusing of particles within the narrow region. For inertial focusing where the narrow channel is taller than it is wide, this will result in focusing of particles into two streamlines near the sidewalls and mid-height of the channel (side focusing). The focused particles can then be extracted as pictured by removing the center streamlines as waste.

For inertial focusing where the narrow channel is wider than it is tall, this will result in focusing of particles into two streamlines along the middle of the channel, but displaced above and below the mid-height of the channel (center focusing). Separation is then accomplished by taking the center streamlines as a product fraction, which retains the focused particles. For viscoelastic focusing, particles migrate to the geometrical center and, depending on the flow conditions, to the corners of the narrow channel (see, e.g., US Published Application No. US2016-0339434). In either case, the product is now in a much smaller volume of sample liquid, and is thus concentrated.

In straight, uncurved channels (no Dean flow), the inertial focusing will result in two or four streamlines in two positions (along the longer sides of the microchannel) if the channel where focusing is happening is more rectangular. Four streamline positions, again near the sidewalls, will result if the channel is closer to a square than a rectangle. The expected streamline positions within a straight microchannel, and how to determine them, are known to those of skill in the field of inertial focusing, as described, for example, in U.S. Pat. No. 9,808,803.

Besides, a simple straight channel, other steady-flow devices that take advantage of inertial focusing (or viscoelastic focusing) can be utilized in an oscillatory mode, provided that the oscillation frequency is high enough to avoid particles traveling too far (e.g., from the beginning of one separation element through a point where separation occurs in a single forward step). For example, the inertial concentrator shown in FIG. 5B excludes particles above a size cutoff from the streamlines nearest the inner wall of the tight curve, then siphons away that fluid bit by bit even as particles continue to be pushed from that near wall in subsequent concentration units. Oscillatory flow will increase the migration distance away from the inner wall of the tight turn because it provides a longer effective travel distance. Therefore, more of the flow can be siphoned after each separation island, allowing a shorter overall device and lower pressure drop for a fixed concentration factor. Alternatively, slower flow can still achieve concentration, reducing the shear stresses experienced, particularly useful for concentration of biological cells.

Figure 5A:
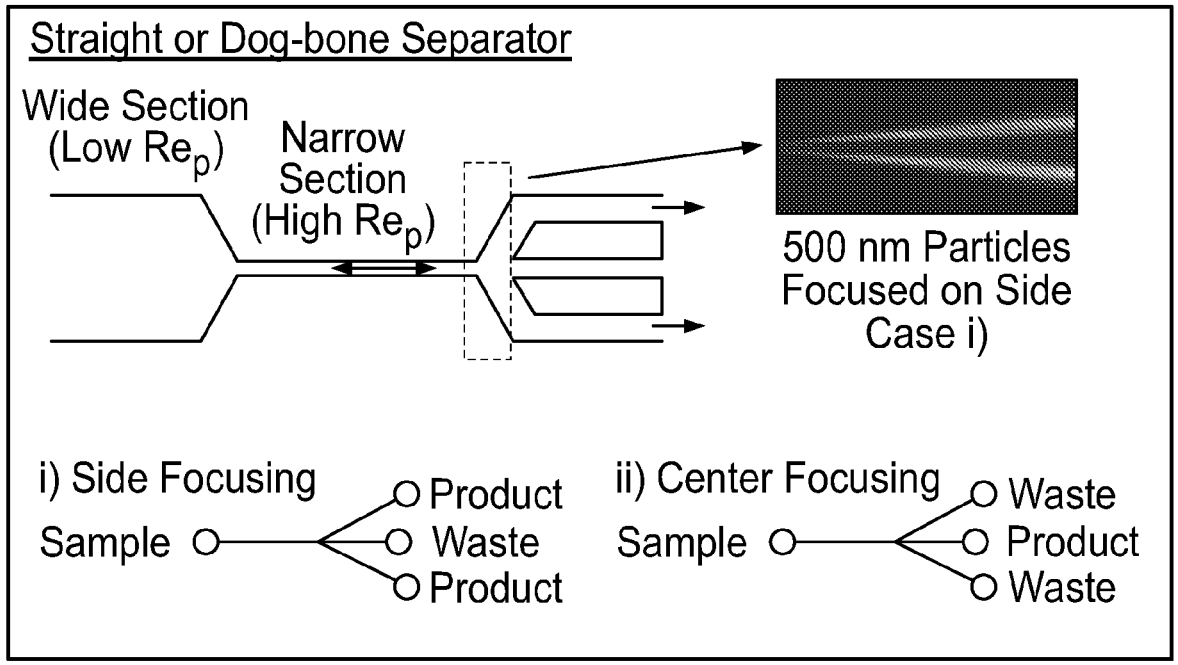
FIG. 5A is a schematic diagram of a "dog-bone" microchannel on a microchip module that provides side or center streamline focusing of waste or product for concentrating a product.
Figure 5B:
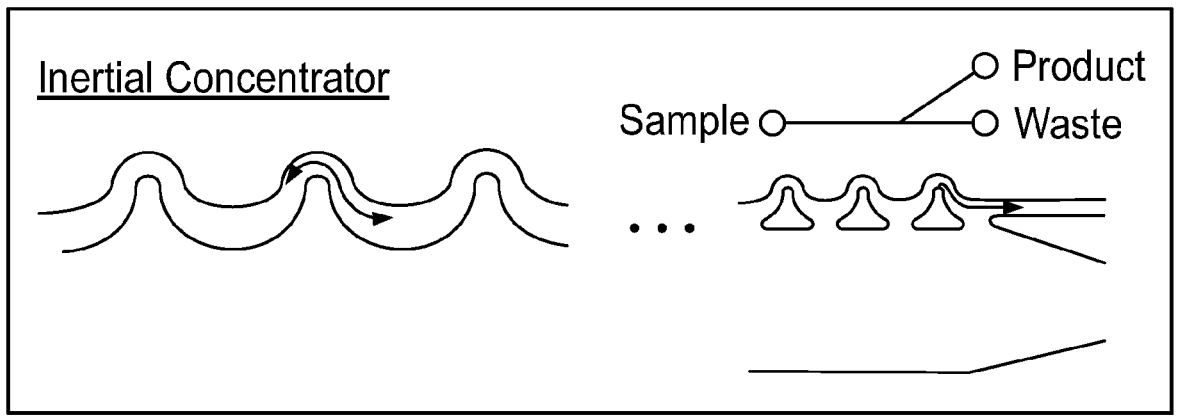
FIG. 5B is a schematic diagram of a sinusoidal inertial focusing module that focuses product in streamlines at the side walls of the module for concentrating a product.

In the embodiment of FIG. 5B the curves and forward flow rates cause the particles (product) to focus into one streamline along a sidewall. The particles in the product streamline are thus concentrated in a much smaller volume of the sample liquid, as the rest of the sample liquid is removed as waste. Note that a curved geometry such as shown in FIG. 5B will have one streamline because of the additional Dean flow. See, for example, U.S. Pat. No. 9,808,803.

To take advantage of the alternating flow control, one useful implementation involves three controlled pressure ports, one for sample, product, and waste (FIGS. 5C and 5D). By oscillating the pressures such that sample pressure is high when the waste and product pressures are low, and vice versa, the focusing length can be sufficient even within a short narrow section for effective separation. In this embodiment, the high and low pressures are kept constant between the forward and reverse phases of operation, but more time is spent in the forward flow step as shown in the graph of FIG. 5E. This results in a forward bias such that separation would take place without need of further intervention.

Separation by Pressure Control and Forward Flow Bias

Besides concentration of focused particles, oscillatory flow can also be applied to displace focused particles out of a first fluid and into a second fluid. To accomplish this, the second fluid is most often introduced into a co-flowing set of streamlines (buffer), adjacent to the flow of streamlines containing the input particles (sample). For oscillatory flow, the buffer pressure could then be synchronized to the sample inlet pressure in both the forward and reverse phases, leaving the product and waste pressures synchronized to each other, yet reversed from the buffer and sample reservoir pressures (the simplest implementation).

Figure 6A:
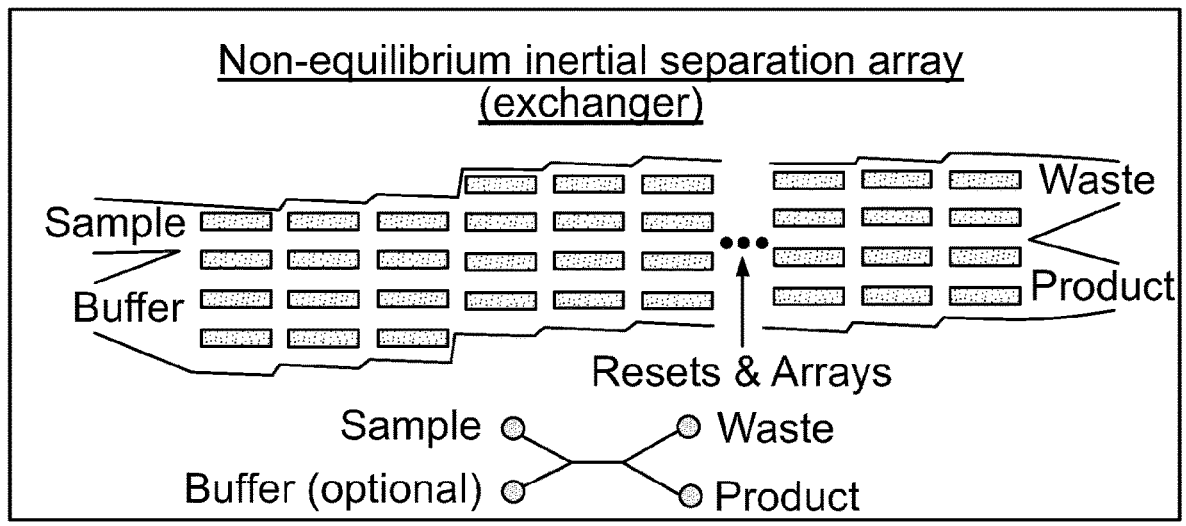
FIG. 6A is a schematic diagram of a non-equilibrium inertial separation array in a microchannel on a microchip module that provides sidewall streamline focusing of waste and product for separation of a product from a sample.

As shown in FIG. 6A, a first example is given, whereby an array of islands progressively separates particles that, through inertial focusing forces, are excluded from the near-wall region from which fluid streamlines are siphoned back. In steady flow, sufficient migration away from the wall must occur only within the length of each island in order for the desired particles to be ultimately displaced into the product lane of the separation device. Taking the simplest form of oscillatory flow control (pressure oscillation from a high to low pressure, with more time spent in the forward phase), the migration distance away from the near wall is no longer limited by the length of the island, since the particle can travel many times the length of the island according to the oscillation frequency and velocity within the particle streamline. Therefore, the fraction of flow siphoned at each break between islands can be increased, resulting in an overall shorter device with reduced pressure drop.

Alternatively, the flow speed can be reduced with the same siphoning fraction applied during steady flow, reducing the shear stress experienced by, for example, biological cells. In this implementation, the travel distance of the particle in the (longer) forward phase should not exceed the length of an island plus the gap distance from one island to the next, otherwise the particles can find themselves in the siphoned streamlines where they will migrate away from the back-wall of the subsequent island, preventing them from reaching the product stream.

Figure 6B:
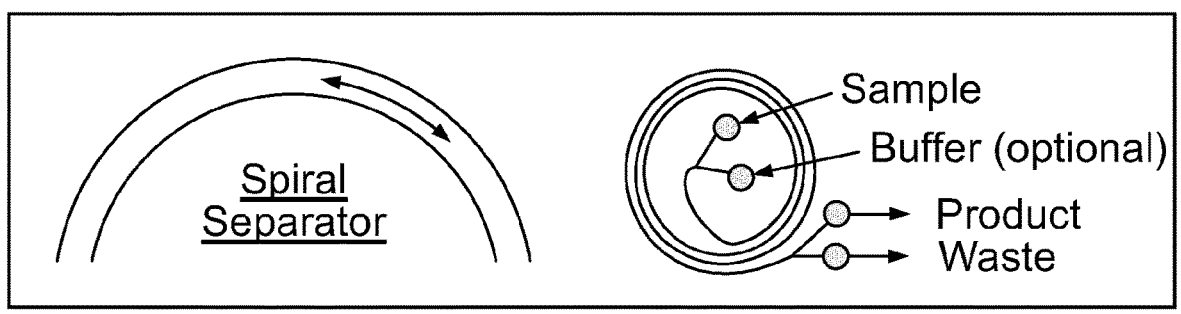
FIG. 6B is a schematic diagram of a spiral inertial focusing module that focuses product in a streamline at a sidewall of the module for separating the product from a sample.

Alternatively, as shown in FIG. 6B, inertial focusing in a spiral device (with co-flow) can be augmented in a similar fashion. One added benefit however for oscillatory flow in spirals arises from the limitation under steady-flow: the radius of curvature must gradually change from inlet to outlet to prevent channels from merging from one turn to the next. In oscillatory flow, the range of channel radius can be greatly reduced (or even eliminated if the curving channel is less than a full revolution). This can be utilized to study the inertial focusing process in spirals besides all of the benefits to reduced pressure drops and shear stresses that are incurred in the other implementations of oscillatory flow to inertial focusing-based separations.

Figure 6D:
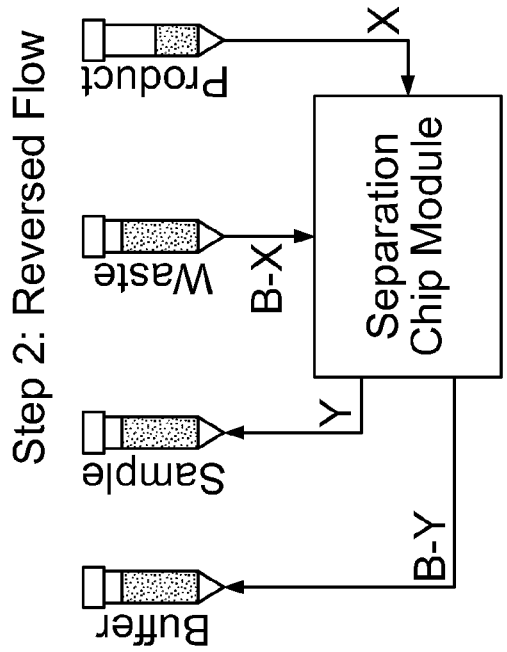
FIGS. 6C and 6D are schematic diagrams showing the inputs and outputs for the separation chip modules of FIGS. 6A and 6B, in forward and reverse flow, respectively.
Figure 6E:
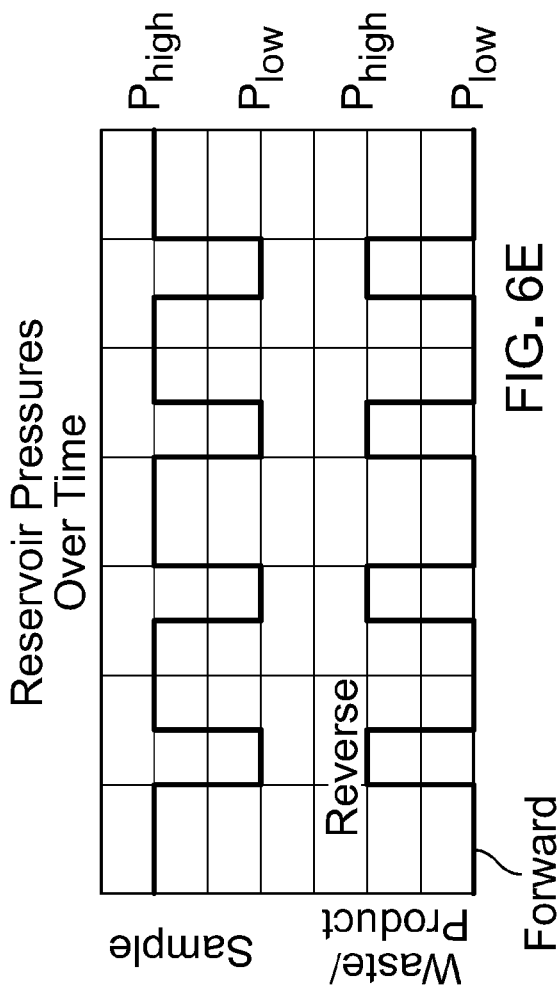
FIG. 6E is a graph of sample and waste/product streams and reservoir pressure over time.
Figure 6C:
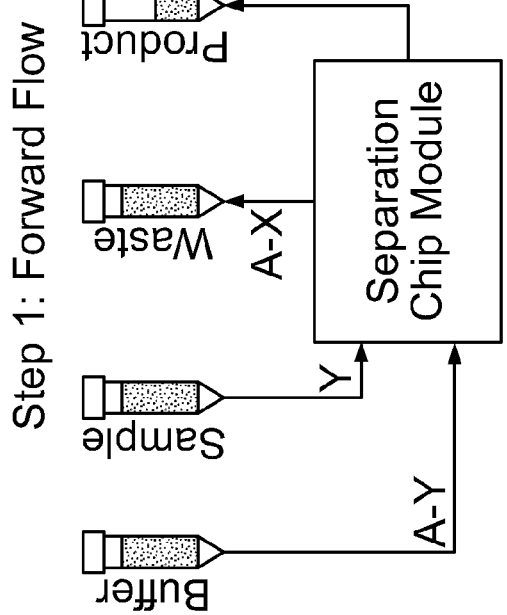

These two systems are shown schematically in FIGS. 6C and 6D, in which the inputs (buffer and sample) and outputs (waste and product) are shown in the forward flow (6C) and reverse flow (6D). The reservoir pressures over time are shown in the graph of FIG. 6E.

These separation devices can also be applied with viscoelastic focusing in an analogous manner with how the straight-channel separator ("dog-bone") format could be adapted for viscoelastic focusing. Only the positions of the focus streams change and flow parameters needed to achieve focusing of particles out of the waste streamlines.

Intermittent Flow

Besides oscillatory flow where the inlet and outlet reservoirs are driven with an oscillatory pressure continuously, intermittent modes of operation are also useful, as shown schematically in FIGS. 7A and 7B. For example, in a concentration focusing chip module, a period of focusing can occur indefinitely in Phase 1 by matching the time and pressure spent in the forward and reverse modes (zero net flow), as shown in FIG. 7A and in particular the graph of oscillating reservoir pressure over time. As shown in FIG. 7B, in Phase 2, concentration can then occur during a specified time spent in the forward phase of flow (see the graph of steady pressure in the reservoirs over time). This would be designed to push the focused particles nearest the separation point all the way beyond a point where no oscillation occurs, thereby achieving separation. This method could be applied also to situations with a second fluid into which particles become displaced.

Intermittent Flow for Water Filtration

One application for enhanced inertial focusing by oscillatory flow is in prolonging the life of filters for water purification or other fluid filtration. In this implementation, particles caught by the filter during a dispensing mode would be removed quickly from the filter pores by AC inertial lift forces away from the wall, then shuttled to a nearby waste port. Because this cleaning step could occur often (perhaps every minute or less), particulates would have little chance to form nonspecific adhesions to the filter before cleaning, yet because the cleaning step could utilize only a tiny volume of water, essentially all the water would proceed on into the product with just a tiny volume excreted as waste. There would also be no need for an additive as in the case of viscoelastic focusing. This particular application could find use in consumer refrigerators, attachments to faucets, and even handheld water purification kits. Any type of filter, e.g., flat filters and hollow fiber filters, can be modified (e.g., to alter the flow patterns and to include a waste port if not already present) using the new systems and methods. It is worth pointing out that this would be impossible without the dramatic reduction in pressure drop afforded by AC inertial focusing.

In one embodiment of water filtration shown in FIGS. 8A and 8B, intermittent oscillatory flow is used to clean particles from a filter. As shown in FIG. 8A, a filter can be cleansed intermittently in Phase 1 by oscillating the direction of flow between the sample input (dirty water in this case) and the product output (clean water)(see the graph of FIG. 8C). When a focusing element exists on the upstream side of the filter, the filtrate can thus be concentrated into a set of focus streamlines based on the geometry of the focusing channel, and these streamlines can then be removed into a waste output by operating the device as a concentrator, whereby a steady flow from sample is driven to the product and waste outlets such that the focused stream of filtrate exits into the waste port rather than being reintroduced to the filter pores. The primary benefit of using an intermittent mode for filtration is that the filter pores can effectively concentrate the filtrate from a large sample volume into a small on-chip volume of filtrate that is easily focused with a low to zero net flow before concentrating it to the waste.

As shown in FIG. 8B, in Phase 2, the loose particles are removed from the system using a brief forward flow to separate the filtrate and cause it to pass out through one or more waste ports (see FIG. 8D, which schematically shows a water filter in each of Phases 0, 1, and 2). The dirty water to be filtered is then passed through the filter with a steady flow in the forward direction (Phase 0). In FIG. 8D, the water filter has an inlet and one or more waste outlets (two shown) and the small angular islands represent any filter material, though the current methods would work best on shallow filters and hollow fiber filters, i.e., not filters that include a packed bed of particles, because particles trapped deep within a porous filter may have a hard time exiting back upstream for removal post-focusing.

In another embodiment of the filtration application, the inertial fluid forces that cause particles to migrate away from walls can be used to dislodge and then displace particles that have been filtered. This performs oscillation between the sample and waste while the product is closed, then displaces the focused filtrate all to the waste before returning to a steady flow operation from sample to product to filter the sample until the filter needs cleaning again. The advantage is there is no need for a backflow through the filter.

Intermittent Flow for Cell Lysis

This application uses the same configuration as the water filtration scheme described in FIGS. 8A-C, but without Phase 0. The system normally operates at Phase 1 shown in FIG. 8A, and cells are focused into defined streamlines with known shear stresses based on their distance from the wall. By setting the shear stress sufficiently high (e.g., via increased pressure, in a pressure driven system), the cells are lysed because of the prolonged periods of shear stress exposure during oscillation. As the cells are being lysed, the sample is also driven through the filter of the configuration shown in FIG. 8D with a forward bias in the net flow, where the contents of the cells (product) pass, but the cell debris is caught by the filter. Thus, the intracellular contents will be collected after the filter without the cell debris. Then, via Phase 2 depicted in FIG. 8B, the cell debris (waste) will be removed from the filter via side channels if necessary. Note that if the shear stress is not high enough to lyse the cells, the system works simply as a water filter.

Figure 9C:
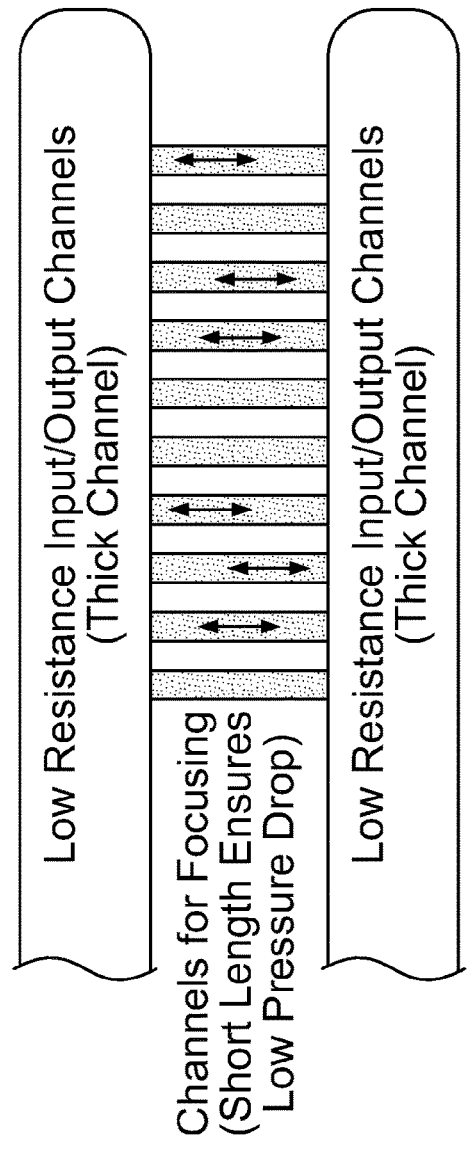
FIG. 9C is a schematic diagram of two low resistance input/output channels separated by multiple thin microchannels for focusing. The input/output channels are relatively "thick," e.g., have a large cross-sectional diameter, and the microchannels have a short length and have a relatively narrow cross-sectional diameter. The short length ensures a low pressure drop along the length of these microchannels.
Figure 9D:
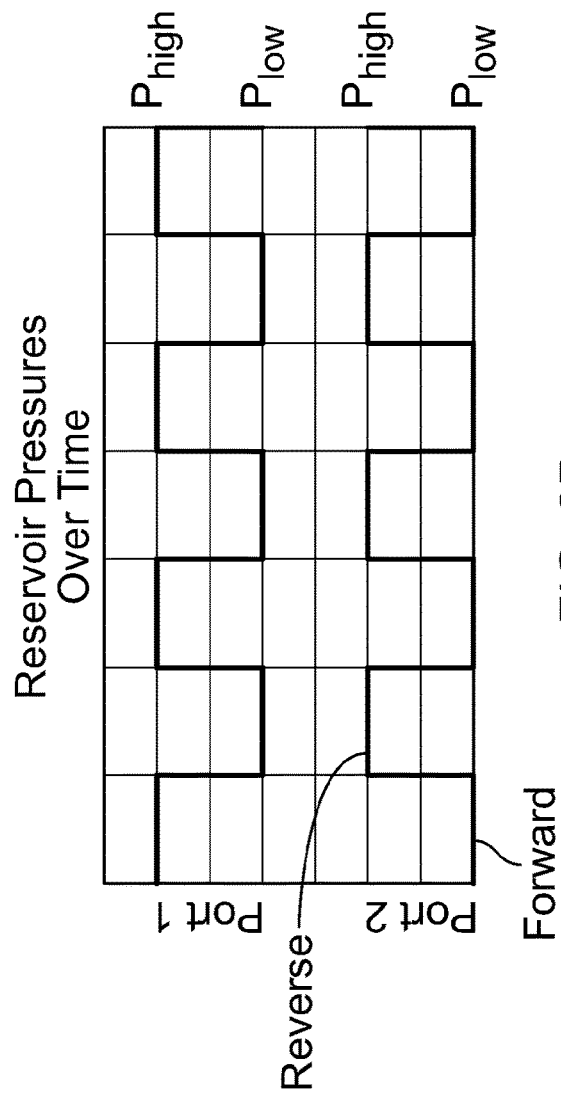
FIG. 9D is a graph of Port 1 and 2 flows and reservoir pressures over time.
Figure 9A:
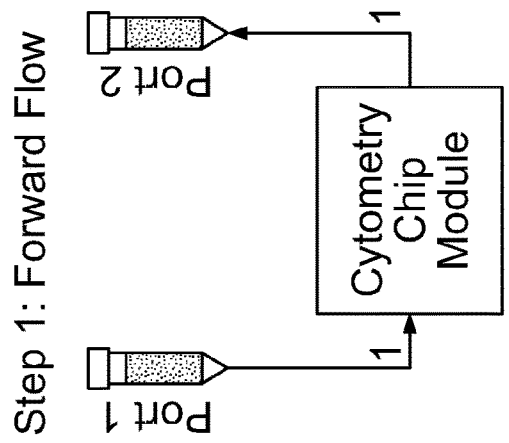
FIGS. 9A and 9B are a pair of schematic diagrams of two ports on a cytometry chip module used for long duration flow cytometry at a controlled shear rate, in the forward and reverse flow modes, respectively.
Figure 9B:
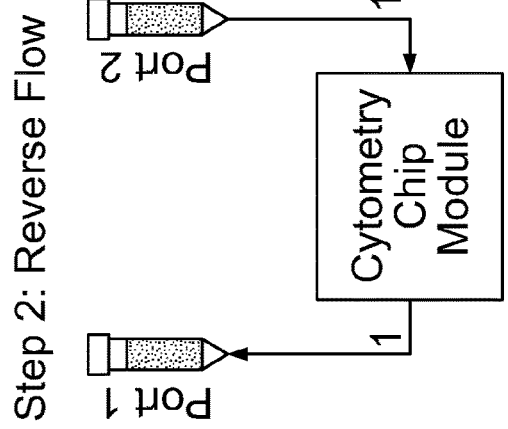

Though the aforementioned configuration utilizes a filter, note that if concentration by the filter is not needed, a single inlet single outlet oscillatory flow setup such as in FIGS. 9A-C (described in further detail below) would enable a continuous lysis of input cell suspension at predictable shear rates. Because the residence time is decoupled from the shear stress due to oscillation, this can enable fine tuning of cell lysis, perhaps at lower shear rates than required by steady flow, resulting in potentially less fragmentation of nucleic acids that are released during the process, or potentially more as desired by extended time of shearing.

Long Duration Cytometry at a Controlled Shear Rate Streamline

One implementation of oscillatory flow to focus particles (by inertial or viscoelastic fluid forces) does not require separation, and that is cell cytometry. For example, focusing of cells into defined streamlines near the walls of the narrow channel will achieve known shear stresses in similar fashion to a cone and plate viscometer or cylinder and drum viscometer, because the cells will be a defined distance from the wall. This can be used to observe the changes to cells under prolonged periods of defined shear stress in the oscillatory mode. This can also be used to observe breaking of individual cell clusters as a means of assaying cell-cell binding strengths.

Alternatively, prolonged imaging of particles from multiple angles under oscillatory flow can enable a 3D reconstruction of their structure, with images being obtained by high-speed video or fluorescence (including laser-scanning confocal imaging) with periodic stops in the flow to hold the particle motionless for a short time. As shown in FIGS. 9A and 9B, this type of setup can operate with a single input and output and zero net flow (see the graph of FIG. 9D) during the focusing and imaging phase. When a new set of particles is desired to observe, the flow can be put into a forward phase until new particles enter the focusing channels (FIG. 9A). By using an architecture where feeder channels are much taller than the focusing channels, a large number of focusing channels could be arrayed in parallel while still being certain of the applied flow speed being relatively consistent throughout all of the focusing channels. This arrangement is shown schematically in FIG. 9C.

Reciprocating Motion to Achieve High RPM Oscillatory Flow

Figure 10A:
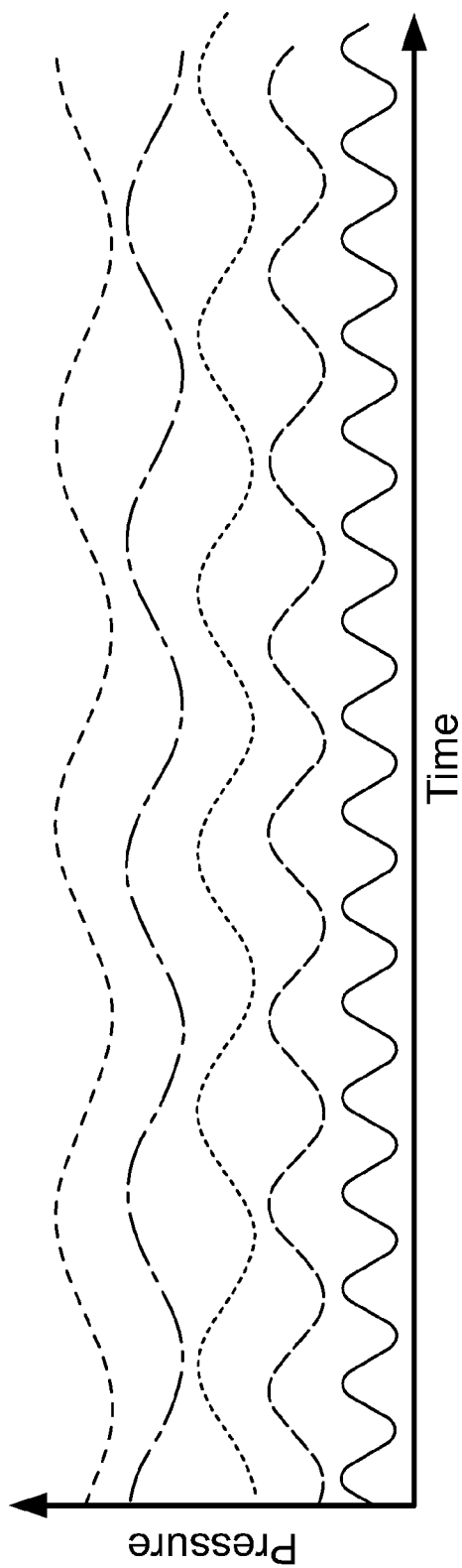
FIG. 10A is a schematic graph of reciprocating motion to achieve high rpm oscillatory flow over time.
Figure 10B:
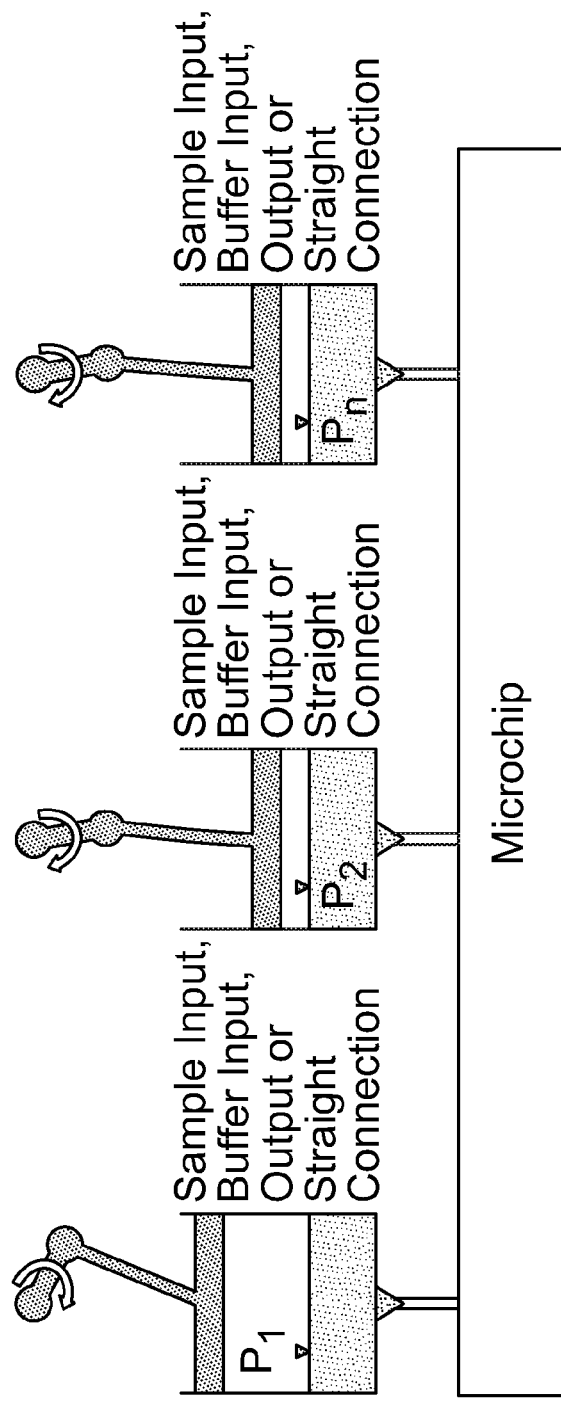
FIG. 10B is a schematic diagram of a microchip with three fluid reservoirs arranged along the microchip for sample input, buffer input, output, etc. and a piston in each reservoir to generate oscillating pressures. These pressures are sinusoidal rather than square waves, though other continuously varying pressure profiles are possible with reciprocating machinery driven oscillatory flow.

Although the simplest form of driving an oscillatory flow is either by controlling the pressure within the input and output fluid reservoirs directly or by switching the input streams between reservoirs at different pressures through valving, additional means of driving oscillatory flows exist. For example, as shown in FIG. 10B, reciprocating devices such as piston-cylinders driven by rotating machinery, are very effective at driving large changes in pressure at high frequencies with great precision. As depicted, an array of fluid reservoirs could be controlled by adjusting the compression ratio (final volume over initial volume in the cylinder), the revolutions per minute, and even the mass of air or gas above the fluid inside the cylinder. The advantage for such methods for pressure control is that they can drive very rapid changes in pressure through simple means; however, the pressure profiles are no longer square waves. Effective separation devices would certainly be possible with sinusoidal pressure control with appropriate accounting for the particle migration speeds at each intermediate pressure. Such sinusoidal pressure control over time is shown in the schematic graph of FIG. 10A.

EXAMPLES

The new systems and methods are further described in the following examples, which do not limit the scope of the invention described in the claims. The following Materials and Methods were used for all of the Examples.

Materials and Methods

Monodisperse fluorescent polystyrene particles (Fluoro-Max, Sigma Aldrich, USA) and bacteria (SH1000-GFP *Staphylococcus aureus* strain, which expresses green fluorescent protein) were diluted in PBS solutions and density matched by adding Optiprep® (Sigma Aldrich, USA). Stock solutions of particles were received at 1% wt/vol concentration, and their final concentration (after dilution) ranged from 0.02% to 0.001% wt/vol based on the particle size.

Bacteria were harvested at $1.7 \times 10^9$ cells/mL concentration, and were diluted 100-fold before being used in the experiments. An air compressor, which can deliver up to 25 psi pressure, was used to drive the flow. The high-speed three-way solenoid valves (LHDA0533315H) were obtained from The Lee Company (CT, USA).

PDMS devices were fabricated using standard soft lithography techniques (30). Microfluidic devices used with larger (a=3, 4.8 and 10 µm) particles had a width (H) of 80 µm and a length (L) of 4.3 cm, and devices used with smaller (a=1, 2 µm) particles had H=40 µm and L=6.2 cm, and the device used with bacteria (a=0.8 µm) had H=80 µm and L=2 cm. Prototype dog-bone microfluidic device had a narrow section with: H=10 µm and L=250 µm, and an expansion section with: H=150 µm and L=5.5 cm. All channels had a fixed depth: W=25±3 µm, except for the dog-bone device which had: W=64±2 µm.

The components of the system were connected to each other via Tygon® Tubing (Cole Parmer, USA). A monochrome Retiga® 2000R camera (Qimaging, BC, Canada) was used to record streak images of the particles. Inertial migration video of an individual particle was obtained by recording with a high-speed camera (Phantom 4.2, Vision Research Inc.) at a frame capture rate (10 fps) that matches oscillation frequency of the flow (10 Hz). Therefore, the particle appears to have minimal horizontal movement, despite travelling outside the field of view and coming back in an oscillation cycle.

Example 1—Inertial Focusing in Oscillatory Flow

We demonstrated the inertial focusing of the particles in an oscillatory flow system by monitoring the particles over time at a fixed location in a straight microchannel. The system consists of a pressure source, a signal (pulse) generator, a valve driving circuit and two high-speed three-way valves (FIG. 1B). The valves are driven by two rectangular signals, where one of the signals is the inverse of the control signal so that the microfluidic circuit is completed in one direction or its reverse. The net flow in the microchannel is adjusted by the duty cycle of the control signal, where 50% corresponds to zero net flow, and any bias towards 0% or 100% duty cycle correspond to a net flow in either direction. In our experiments, since we were monitoring the inertial migration of the same set of particles at a fixed location in the microchannel, we operated the system at zero net flow to be able measure the focusing time of the particles.

Figure 11A:
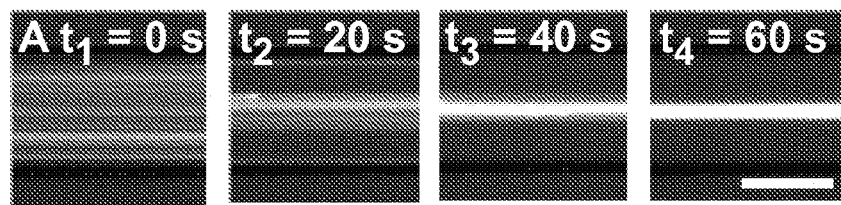
FIG. 11A is a series of streak images of inertial focusing of particles using oscillatory microfluidics to oscillate 3.1 µm particles at the same position in a microfluidic device (H=80 µm) over time (scale bar=50 µm).
Figure 11B:
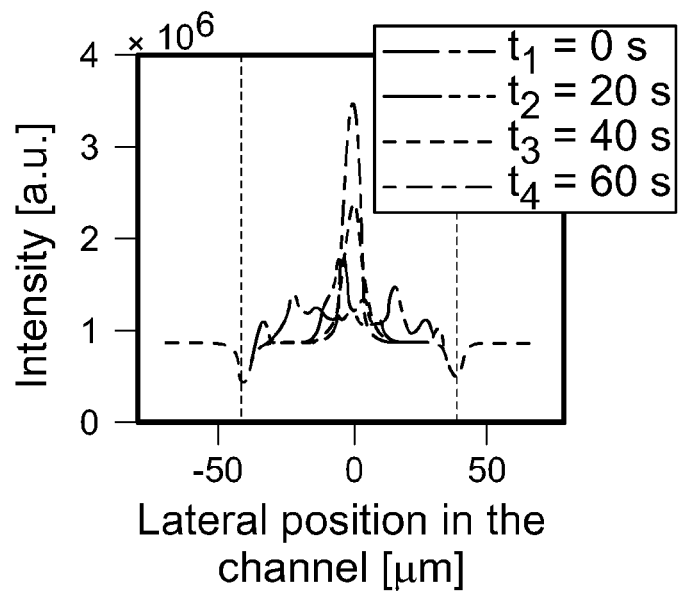
FIG. 11B is an intensity profile graph of the oscillating particles as they become focused.
Figure 11C:
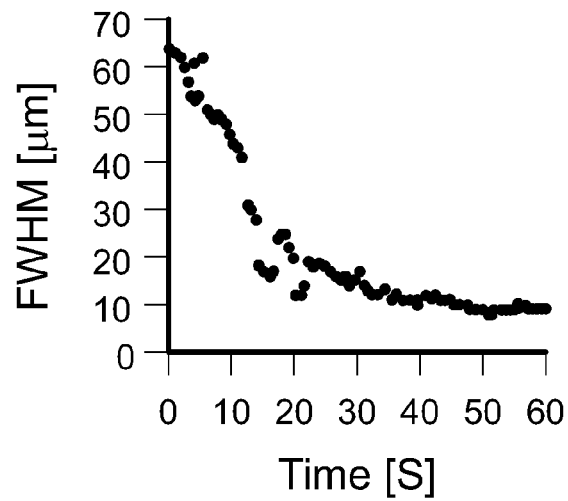
FIG. 11C is a graph showing full width half-maximum (FWHM) analysis over time, used for determining the focus time.

Using the system of FIG. 1B, we were able to track an individual particle as it inertially migrates towards the center of the channel (see Materials and Methods for details) while oscillating (i.e., leaving and re-entering the field of view). However, for characterization of the inertial focusing behavior, we used fluorescence streak imaging with a group of particles (FIG. 11A). The preferred inertial focusing position at the center of the channel resulted in a sharp intensity peak formation over time (FIG. 11B). The focus time ($t_f$)—the time when inertial focusing was achieved—was evaluated using full-width at half-maximum (FWHM) analysis using the streak images (FIG. 11C). Specifically, $t_f$ was determined as the time point where FWHM reached its stable minimum. In this specific case, the focus time ($t_f$) and length ($L_f$) were determined as 48 s and 5.7 m respectively, corresponding to two orders of magnitude enhancement to the physical channel length (~0.04 m).

Note that experimental determination of $L_f$ in an oscillatory flow requires measurement of particles' travel length. For streak imaging, this requires very dilute particle solutions and the oscillatory travel path of the particles to be restricted to the imaged area of the microchannel, which is impractical at low oscillation frequencies. Due to these complications, we opted to calculate $L_f$ based on the mean flow velocity using: $L_f = t_f U_m$, where $t_f$ is the experimentally determined focus time.

Upon validation of the oscillatory inertial focusing, the system was further tested with 3.1, 4.8 and 10 µm particles at varying flow velocities. The flow velocity in the microchannel was adjusted by varying the driving pressure from 1 psi to 25 psi. To keep the $Re_p$ within a comparable range for different size particles, the tested pressure range was decreased as the particle size increased. This also ensured that when the particles were introduced to the channel, there was no inertial focusing and particles were randomly distributed. The investigated frequency range for each particle size/pressure pair was selected based on the calculated mean velocity of the particles at a given pressure (P), focusing time ($t_f$) of the particles, and the response time of the microfluidic valves. Specifically, the minimum frequency was set to ensure that the particles stayed in the channel during their oscillatory travel. Thus, for instance, at high pressures (i.e., high $U_m$), lower frequencies were not tested as the particles would have to leave the channel. The maximum frequency (f=20 Hz) was set to ensure that the response time of the valve (~5 ms) was small compared to the period of oscillation, however high speed valves in the kHz range are available commercially.

Figure 12A:
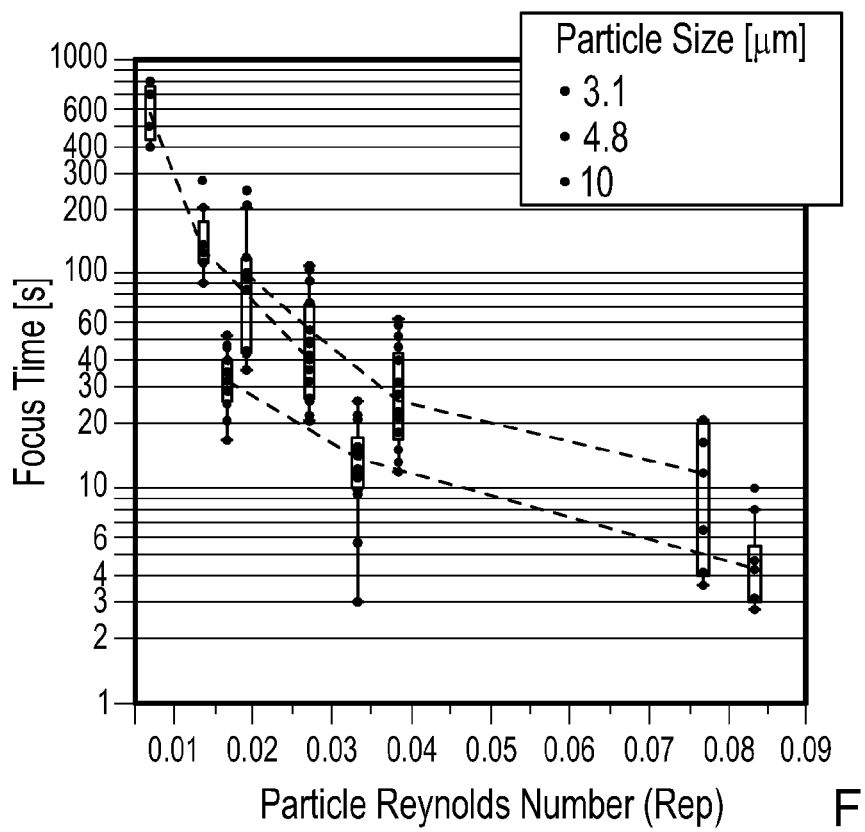
FIGS. 12A and 12B are a pair of graphs showing attained focus times (14A) and focus lengths (14B) of 3.1 to 10 µm particles at varying $Re_p$.
Figure 12B:
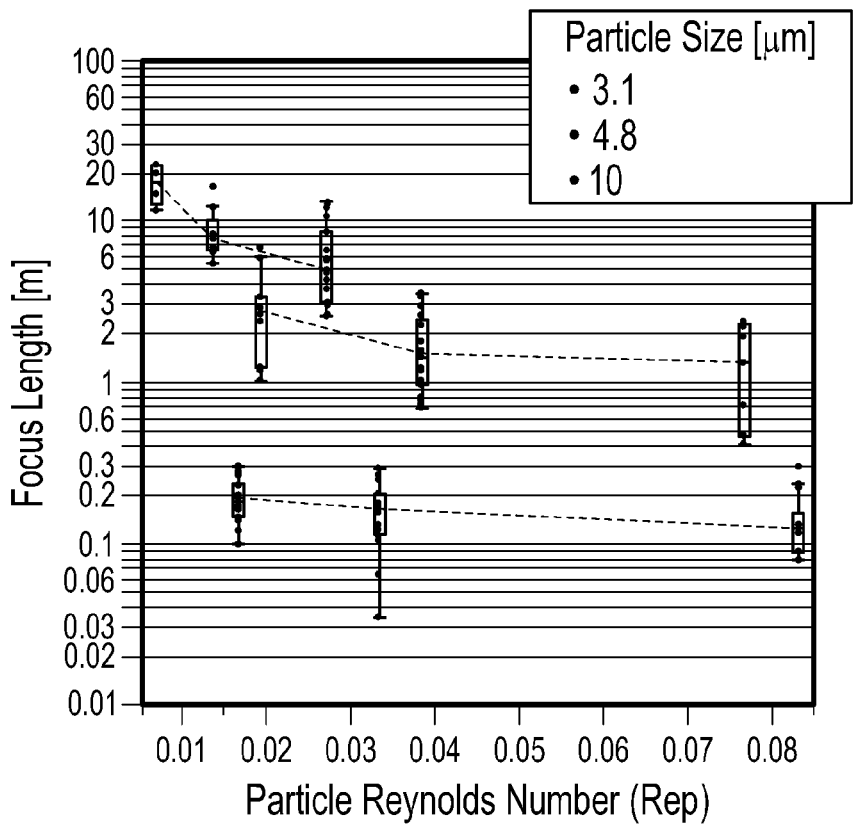

A trend between increased $Re_p$ and decreased focus time ($t_f$) and focus length ($L_f$) was observed, for a constant particle size (FIGS. 12A and 12B). The fastest focusing (~5 s) was achieved with 10 µm particles at 5 psi driving pressure ($Re_p$=0.083), while the slowest focusing (~10 min) was achieved with 3.1 µm particles at the same pressure ($Re_p$=0.0068). As shown in FIG. 12A, note that while faster focusing could be attained for 10 µm particles using a higher pressure, we opted to limit the pressure to maintain the $Re_p$ values comparable to the smaller particles and ensure that the particles were not focused while entering the channel, as previously discussed. Thus, 5 psi was the highest pressure selected for 10 µm particles and the lowest pressure selected for 3.1 µm particles.

Attained focus lengths ($L_f$) ranged approximately from 0.1 m up to 20 m (FIG. 12B). The shortest $L_f$ was achieved with the 10 µm particles at 5 psi, while the longest $L_f$ was achieved with the smallest (3.1 µm) particles at 5 psi. For different size particles operating at a similar $Re_p$, $L_f$ decreased with increasing a, which shows that a and $L_f$ were explicitly correlated, beyond their implicit correlation via $Re_p$. For these set of experiments, the channel width (the dimension that the migration is observed, H) was 80 µm, thus a/H changed from 0.8 to 0.04, as the particle size got smaller. Therefore, we also concluded that the finite particle assumption did not hold for the explored particle size range.

Figure 13A:
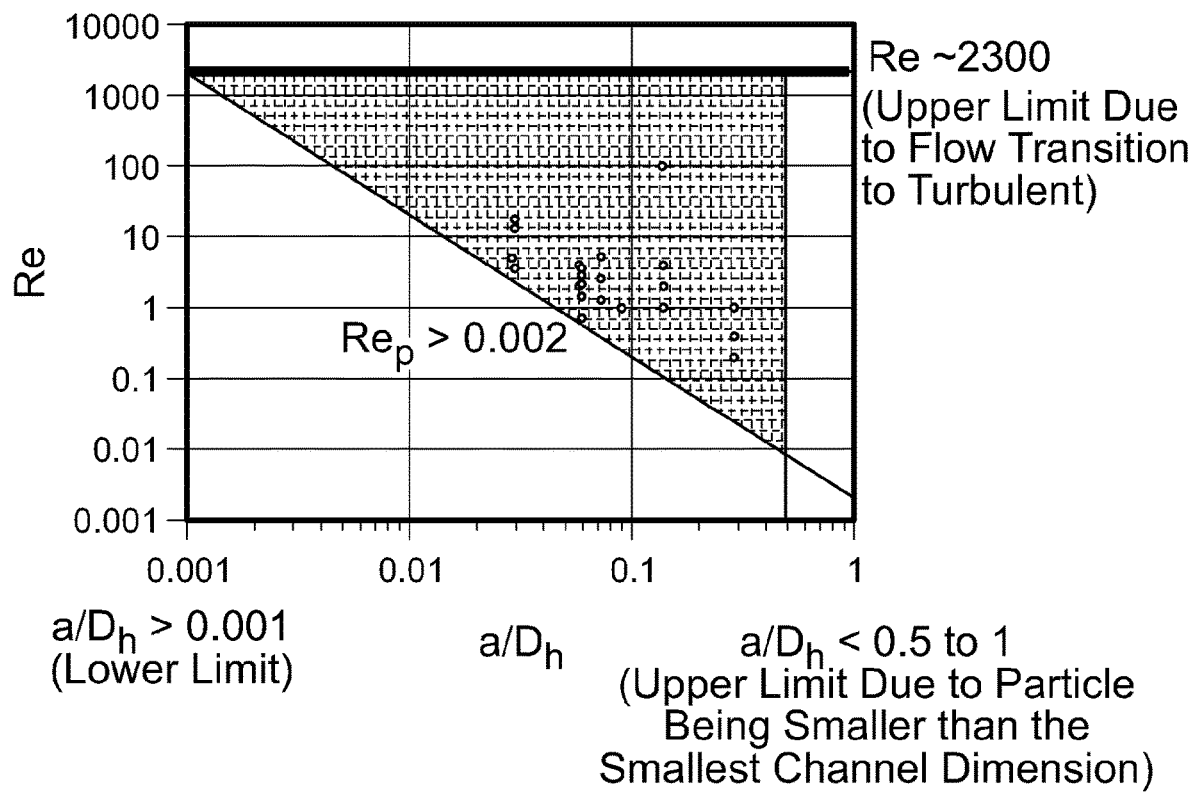
FIG. 13A is a graph showing various parameters of oscillatory inertial focusing including an upper limit of Reynolds number (Re) of about 2300, a particle Reynolds number ($Re_p$) of greater than 0.002, and a ratio of particle diameter (a) to hydraulic diameter ($D_h$) in a range of about $0.001 < a/D_h <$ about 0.5 to 1.0.
Figure 13B:
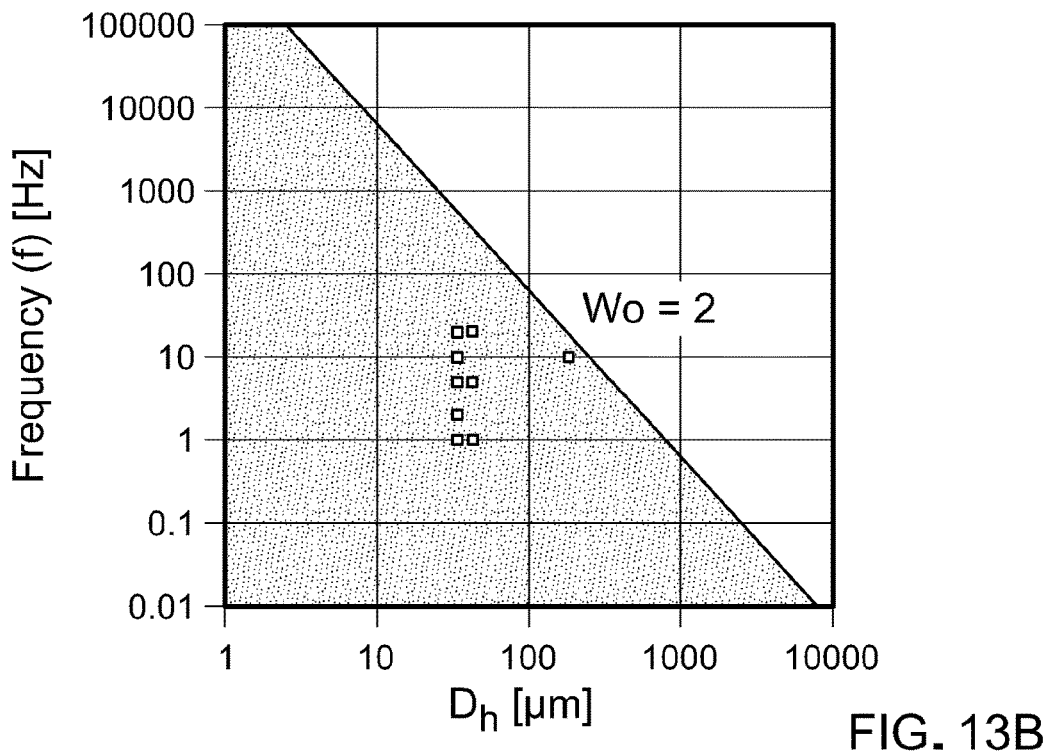
FIG. 13B is a graph showing oscillation frequency and $D_h$ space in which oscillatory inertial focusing works, i.e., where the Womersley number (Wo) is as large as 2.0 (but is typically less than 1.0).

Based on our data, we identified that inertial focusing in oscillatory flow can occur at $Re_p$ values as small as 0.002. Since $Re_p$ and Re are correlated via $(a/D_h)^2$, we identified a triangular parameter space bound by Re, $Re_p$, and $a/D_h$ (see FIG. 13A). This space is bound on the upper end by Re≈2300 due to the laminar to turbulent transition of the flow, though it should be noted that this limit is conservative since onset of turbulence can be pushed to much higher Reynolds numbers with viscoelastic additives and/or smoother channel sidewalls for example. On the lower end, it is bound by our lowest experimentally observed $Re_p$ (0.002), and $a/D_h$<about 0.5-1.0, which ensures that particles are smaller than the smallest cross-sectional dimension of the channel. We also experimentally observed that oscillatory inertial focusing occurs at Womersley number (Wo) as large as 2, e.g., 1.25, 1.5, or 1.75 (note that Wo determines whether entrance length effects can be ignored), but Wo is typically less than 1.0. Since Wo is correlated to frequency (f) and $D_h$, we also identified an oscillation frequency and $D_h$ space that oscillatory inertial microfluidics would work (see FIG. 13B).

Figure 14A:
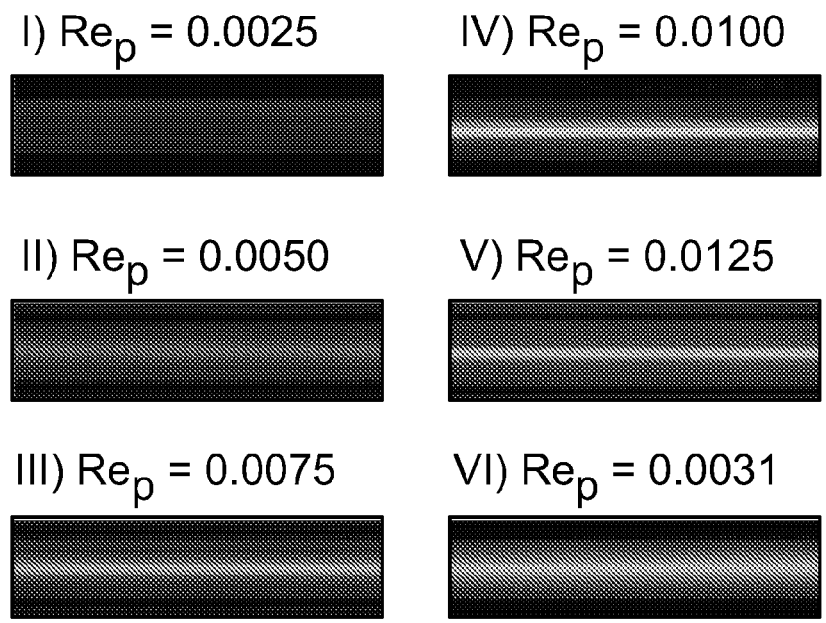
FIG. 14A is a streak image showing oscillatory inertial focusing with diffusion limitation in a microchannel (L=6.2 cm, H=40 µm) with the focused 2 µm (and 1 µm) particles after $t_f$ and their corresponding Rep values.

Example 2—Inertial Focusing of Micron to Submicron-Scale Particles in Oscillatory Flow A previously unexplored diffusion barrier on inertial focusing became evident when focusing particles that are 2 μm or smaller. We observed no focusing behavior with the 2 μm particles at the lowest tested pressure ($Re_p$=0.0025), even after the particles had travelled for extremely long times and distances in the microchannel (10 min and 12.7 m, respectively) (FIG. 14A). Therefore, we concluded that at this critically low $Re_p$ range, a diffusion limited no-inertial-focusing region was present.

Figure 14B:
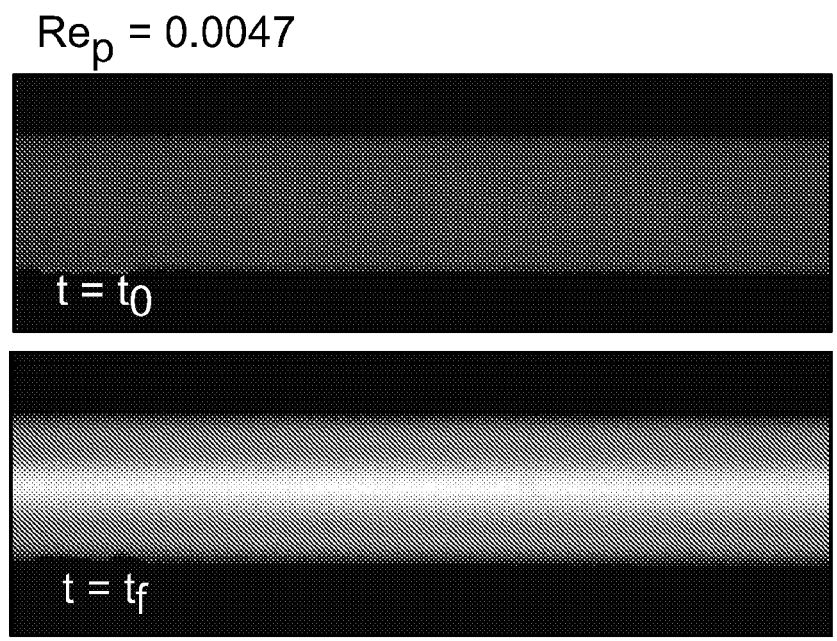
FIG. 14B is graph showing the FWHM evolution profiles of 2 µm particles from $Re_p$=0.0025 to 0.0125 (dot sign), and 1 µm particles at $Re_p$=0.0031 (plus sign).

When the $Re_p$ was increased to 0.0050, focusing was observed but the focused streamline was uncharacteristically wide, as the system transitioned from diffusion dominated to inertially controlled regime. Only when the $Re_p$ was increased beyond 0.0075, a typical, narrowly focused particle stream was observed. Using the same device with 1 μm particles, focusing was observed only at the highest allowable pressure ($Re_p$=0.0031). The different regimes based on the focus quality (i.e. width of the attained particle stream) were also quantified using FWHM evolution plots (FIG. 14B).

In the diffusion limited particle size range, higher flow velocities are required to improve $Re_p$ and focus quality, while maintaining the inertial focusing length in the order of meters. This is impractical with steady-flow due to the extreme pressure requirement, but oscillatory microfluidics allows virtually infinite lengths without increasing the pressure, and the minimum physical channel length is only limited by the maximum frequency of the high-speed valves or other pressure-controlling elements (e.g., rotating machinery or pressure controllers). We used a shorter and wider device to focus *Staphylococcus aureus* to compensate for the decrease in the $Re_p$ due to the smaller particle size (0.8 μm), thereby enabling operation at a higher $Re_p$ (0.0047) than 1 μm particles without increasing the pressure.

Figure 14C:
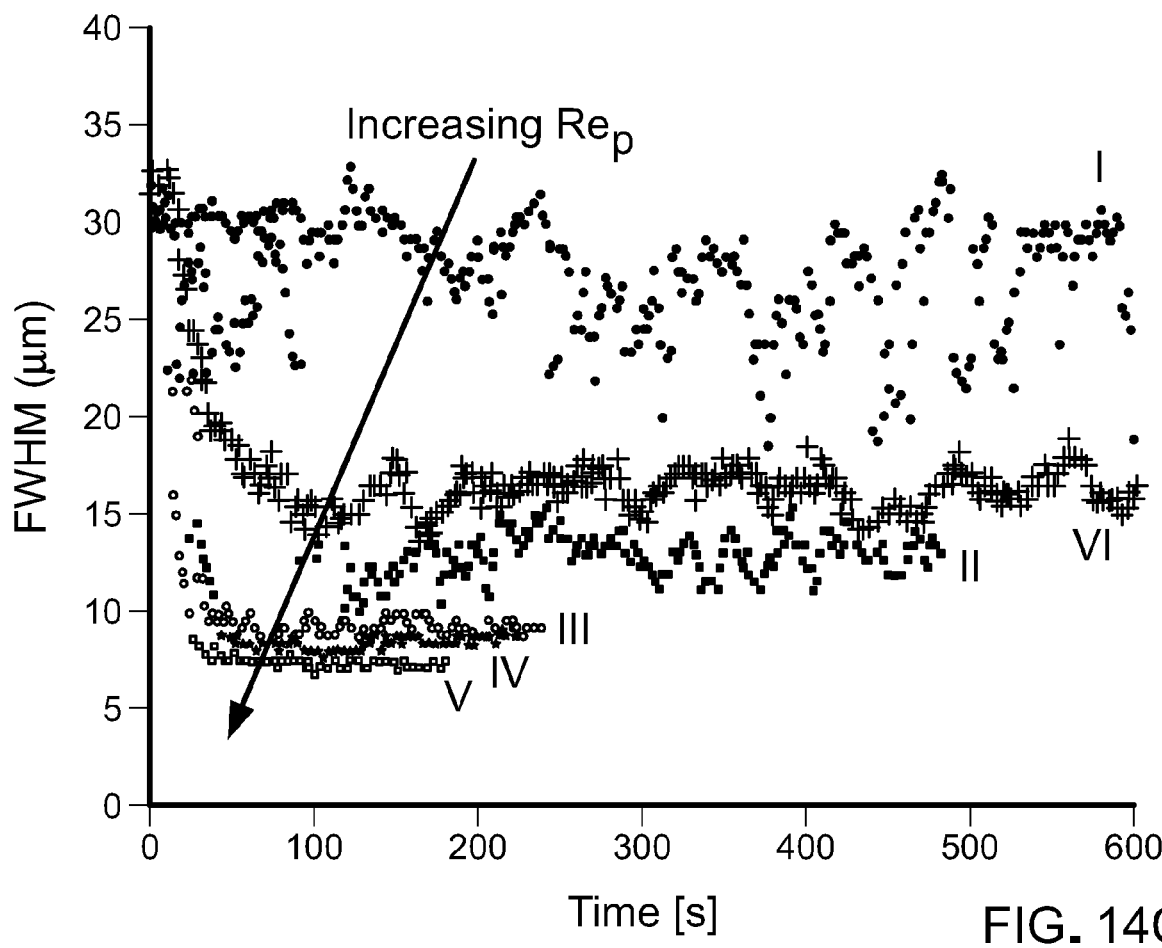
FIG. 14C is a pair of streak images of the microchannel (L=2 cm, H=80 µm) before and after focusing bacteria (0.8 µm) *Staphylococcus aureus*.
Figure 14D:
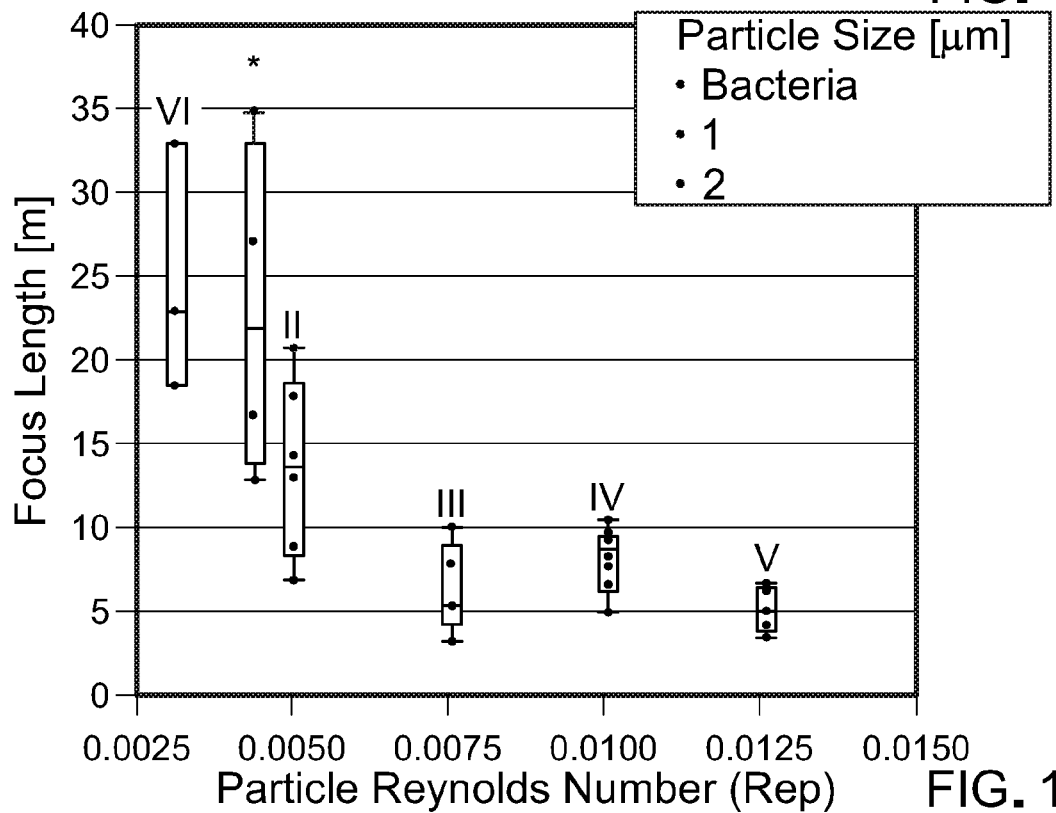
FIG. 14D is a graph of attained focus lengths of 1, 2 µm particles and bacteria at varying $Re_p$ (a shorter device is used for the bacteria experiments to achieve higher $Re_p$).

Note that in this case, the channel dimension in which we observed particle migration and focusing was 2 orders of magnitude larger than the particle size (a/H=0.01). Under these parameters, we observed inertial focusing of bacteria (FIG. 14C), and the focus quality was similar to the previous results at a comparable $Re_p$ range. For this set of experiments, the longest focus length ($L_f$=24.7±7.4 m) was attained with 1 μm particles (FIG. 14D).

Example 3—Varying Cross-Section (Dog-Bone) Microchip Design

Figure 15A:
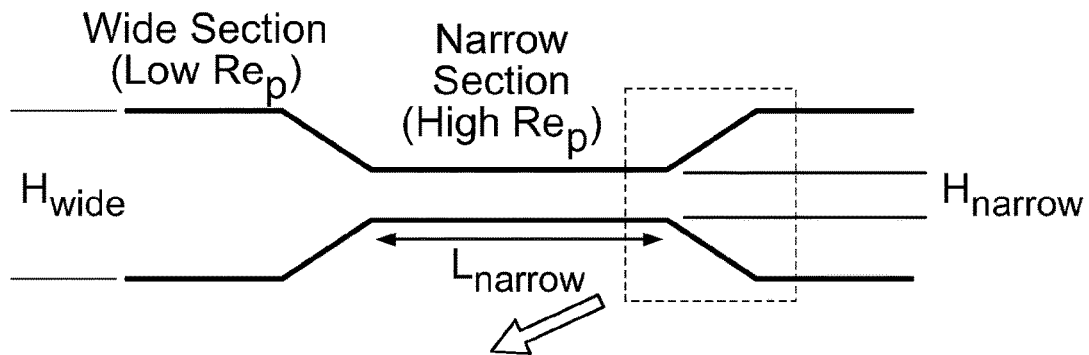
FIG. 15A is a schematic of a "dog-bone" shaped microchannel ($H_{narrow}$=10 $L_{narrow}$=250 µm, $H_{wide}$=150 µm, $L_{wide}$=5.5 cm and W=64 µm) demonstrating oscillatory inertial focusing of 500 nm particles in the microchannel.

Based on our findings, we developed a prototype dog-bone shaped microfluidic chip for inertially focusing smaller (i.e. a few hundreds of nm) particles. Our previous results demonstrated that to achieve high quality inertial focusing, $Re_p$ needs to be sufficiently high. Thus, the further decrease in the particle size needs to be compensated by increased flow velocity. To achieve this, a varying cross-section microchip was designed with a very narrow and short section, where the small cross-sectional area and short length enables higher flow velocity. The narrow section is connected to two wider sections of the channel, where the pressure drop is reduced, and the decreased flow velocity ensures that the particles are kept in the channel during their oscillation. The resulting shape, similar to a "dog-bone," is shown in FIG. 15A.

Figure 15B:
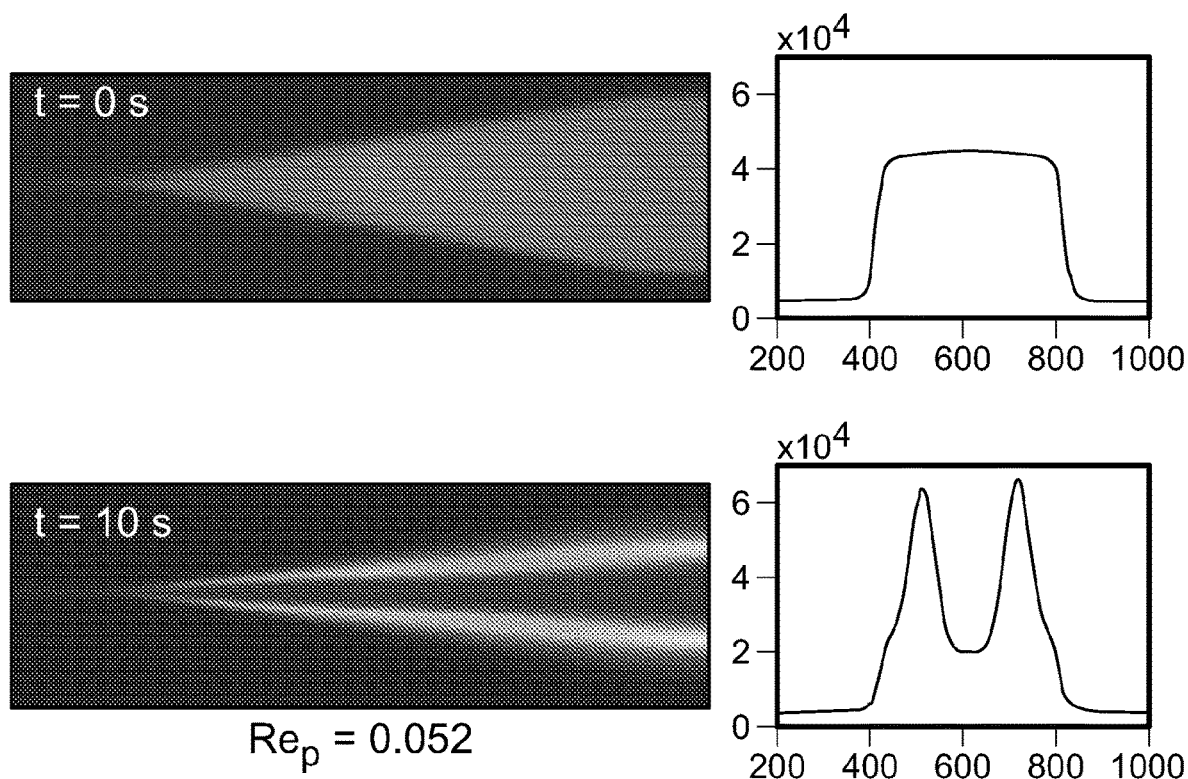
FIG. 15B is a pair of fluorescent streak images (left) and corresponding FWHM graphs (right) showing oscillatory inertial focusing with 500 nm particles.

It was observed that at P=25 psi, 500 nm particles focused on the side focusing positions of the channel (FIG. 15B), as a result of the preferred focusing positions shifting to the sides due to the high depth to width ratio (W/H=6.4) of the narrow section. Even though this ratio is less than unity in the expansion section (W/H=0.42), the inertial lift forces are also significantly weaker, thus the focusing positions are determined by the geometry of the narrow section where focusing takes place. Using this geometry, the corresponding flow parameters in the narrow section of the channel were calculated as: $Re_p$=0.052; well within the range where we were able to obtain focusing using straight channels (FIG. 15B). Similar to those results, focusing was attained in a short time-scale ($t_f$=10 s).

Example 4—Low (Physiological) Shear Stress at Very Low $Re_p$

Operating at a very low $Re_p$ range also enables particles that are similar to white blood cells in size (10 μm) to be inertially focused at very low input pressures and larger channels, which translates to cells being exposed to minimal, physiological-scale shear stress levels. This is desirable to ensure that cells remain unharmed and do not exhibit a shear-induced response, and also to avoid clogging and malfunction of blood processing devices, due to shear stress activation of platelets and von Willebrand factor (vWF) fibers (26, 27). The physiological shear stress levels in the veins and arteries are reported as 1-6 dynes/cm$^2$ and 10-70 dynes/cm$^2$, respectively.

We conducted a finite element simulation of a fully developed flow in our microchannel using COMSOL MULTIPHYSICS® computational fluid dynamics software (COMSOL Inc., Burlington, Mass.). We applied the same flow conditions (applied pressure, fluid properties) where we previously observed focusing of 10 μm particles (80 μm×25 μm cross-section). Note that these particles are comparable to white blood cells, and smaller than other clinically relevant nucleated cells (e.g. circulating tumor cells (CTCs).

We evaluated the maximum (on the channel wall), and the average shear stress as 18.4 dynes/cm$^2$ and 8.3 dynes/cm$^2$ respectively, which are both in the physiological range. Because it gets easier to focus particles with larger diameters, it is reasonable to assume that larger nucleated cells such as CTCs or CTC clusters would be focused at even lower flow rates. Therefore, we concluded that white blood cells and larger nucleated cells or clusters can be inertially focused under conditions that are similar to physiological conditions, therefore can be ensured to not be harmed by the microfluidic process.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. An oscillatory fluidic system for focusing of particles in a fluid sample into one or more streamlines within a fluid flowing in a channel, the system comprising:
   a fluid oscillator for alternating a direction of flow of the fluid in a channel that comprises an array of islands or a spiral geometry; and
   a controller arranged and configured to transmit control signals to the fluid oscillator to generate a repeating oscillating flow profile of the fluid sample in the channel, wherein the flow profile includes at least one step in a first direction of flow and at least one step in a second direction of flow opposite to the first direction of flow, for a set period of time,
   thereby focusing the particles into one or more streamlines within the fluid flowing within the channel.

2. The system of claim 1, wherein dimensions of the channel and the controller are configured to provide inertial focusing.

3. The system of claim 1, wherein dimensions of the channel and the controller are configured to provide viscoelastic focusing when a fluid in the channel is selected to have an appropriate viscoelasticity.

4. The system of claim 1, wherein the fluid oscillator comprises a source of pressure or flow arranged and controlled to provide an oscillating pressure on, or flow of, the fluid to provide the oscillating flow profile within the channel.

5. The system of claim 1, wherein the fluid oscillator comprises a source of constant pressure or constant flow arranged and controlled to provide a constant pressure on, or constant flow of, the fluid within the channel, and the fluid oscillator further comprises two or more valves arranged along the channel and controlled to provide the oscillating flow profile within the channel between the two or more valves by directing the constant pressure or flow from the source alternatingly at a first location along the channel and then at a second location along the channel.

6. The system of claim 5, wherein the fluid oscillator further comprises a signal generator and a valve driving circuit, and wherein the two or more valves comprise high-speed, three-way valves.

7. The system of claim 1, wherein the frequency of oscillations is from about 0.01 Hertz to about 100 Hertz.

8. The system of claim 1, wherein particles flowing within the fluid move a distance of 1.0 micron to 100 cm in the first direction of flow, and then 1.0 micron to 100 cm in the second direction of flow.

9. The system of claim 1, wherein the channel comprises a first section having a first hydraulic diameter, a second section in series with the first section and having a second hydraulic diameter smaller than the first hydraulic diameter, and a third section in series with the second section and having a third hydraulic diameter larger than the second hydraulic diameter.

10. A method for focusing of particles in a fluid sample into one or more streamlines within a fluid flowing within a channel, the method comprising:
    introducing into a channel a first fluid comprising particles to be focused;
    introducing into the channel a second fluid co-flowing with the first fluid;
    controlling a flow rate of the first fluid and the second fluid in the channel to generate a repeating oscillating flow profile of the first fluid and the second fluid in the channel, wherein the flow profile includes at least one step in a first direction of flow and at least one step in a second direction of flow opposite to the first direction of flow, for a set period of time,
    thereby displacing focused particles out of the first fluid and into the second fluid within the channel.

11. The method of claim 10, wherein the channel comprises a millimeter or micrometer channel.

12. The method of claim 11, wherein dimensions of the channel and the flow rate are selected to provide inertial focusing.

13. The method of claim 11, wherein dimensions of the channel and the flow rate are selected to provide viscoelastic focusing when the first fluid in the channel is selected to have an appropriate viscoelasticity.

14. The method of claim 10, wherein controlling a flow rate of the first fluid comprises providing a source of pressure or flow and controlling the source of pressure or flow to provide the oscillating flow profile within the channel.

15. The method of claim 10, wherein controlling the flow rate of the first fluid comprises providing a source of constant pressure or constant flow controlled to provide a constant pressure on, or constant flow of, the first fluid within the channel, controlling two or more valves arranged along the channel, and providing the oscillating flow profile within the channel between the two or more valves by directing the constant pressure or flow from the source alternatingly at a first location along the channel and then at a second location along the channel.

16. The method of claim 10, wherein channel dimensions are selected, and the flow rate of the first fluid in the channel is controlled, such that a Reynolds number within the channel in each direction of flow is from about 0.01 to 2300.

17. The method of claim 10, wherein the frequency of oscillations is from about 0.01 Hertz to about 100 Hertz.

18. The method of claim 10, wherein particles flowing within the first fluid move a distance of 1.0 micron to 100 cm in the first direction of flow, and then 1.0 micron to 100 cm in the second direction of flow.

19. The method of claim 10, wherein the hydraulic diameter (Dh) of the channel is selected to achieve a ratio of particle diameter a to Dh to be greater than 0.001 and less than 1.0.

20. The method of claim 10, wherein the flow rate is controlled to achieve at least one of the following parameters:
    a particle Reynolds number (Rep) greater than about 0.002;
    a channel Reynolds number (Re) less than about 2300;
    a channel hydraulic diameter (Dh) larger than a particle diameter a;
    and
    a Womersley number (Wo) less than about 1.

21. The system of claim 1, wherein the array of islands comprises a two-dimensional array of islands.

22. The system of claim 1, comprising:
    a first fluid input and a second fluid input coupled into a first side of the channel; and
    a first fluid output and a second fluid output coupled to a second side of the channel opposite to the first side of the channel.

23. The method of claim 10, wherein controlling the flow rate of the fluid in the channel to generate the repeating oscillating flow profile is performed intermittently.

24. An oscillatory fluidic system for focusing of particles in a fluid sample into one or more streamlines within a fluid flowing in a channel, the system comprising:
- a fluid oscillator for alternating a direction of flow of the fluid in a channel that comprises an array of islands; and
- a controller arranged and configured to transmit control signals to the fluid oscillator to generate a repeating oscillating flow profile of the fluid sample in the channel, wherein the flow profile includes at least one step in a first direction of flow and at least one step in a second direction of flow opposite to the first direction of flow, for a set period of time,
- thereby focusing the particles into one or more streamlines within the fluid flowing within the channel,
- wherein the channel comprises a first section having a first hydraulic diameter, a second section in series with the first section and having a second hydraulic diameter smaller than the first hydraulic diameter, and a third section in series with the second section and having a third hydraulic diameter larger than the second hydraulic diameter.

25. The system of claim 24, further comprising a millimeter or micrometer channel.

26. The system of claim 24, wherein dimensions of the channel and the controller are configured to provide inertial focusing.

27. The system of claim 24, wherein dimensions of the channel and the controller are configured to provide viscoelastic focusing when a fluid in the channel is selected to have an appropriate viscoelasticity.

28. The system of claim 24, wherein the fluid oscillator comprises a source of pressure or flow arranged and controlled to provide an oscillating pressure on, or flow of, the fluid to provide the oscillating flow profile within the channel.

29. The system of claim 24, wherein the fluid oscillator comprises a source of constant pressure or constant flow arranged and controlled to provide a constant pressure on, or constant flow of, the fluid within the channel, and the fluid oscillator further comprises two or more valves arranged along the channel and controlled to provide the oscillating flow profile within the channel between the two or more valves by directing the constant pressure or flow from the source alternatingly at a first location along the channel and then at a second location along the channel.

30. The system of claim 29, wherein the fluid oscillator further comprises a signal generator and a valve driving circuit, and wherein the two or more valves comprise high-speed, three-way valves.

31. The system of claim 24, wherein channel dimensions are configured and the flow rate of the fluid in the channel is controlled such that a Reynolds number within the channel in each direction of flow is from about 0.01 to 2300.

32. The system of claim 24, wherein the frequency of oscillations is from about 0.01 Hertz to about 100 Hertz.

33. The system of claim 24, wherein particles flowing within the fluid move a distance of 1.0 micron to 100 cm in the first direction of flow, and then 1.0 micron to 100 cm in the second direction of flow.

34. The system of claim 24, wherein the hydraulic diameter (Dh) of the channel is selected to achieve a ratio of particle diameter a to Dh to be greater than 0.001 and less than 1.0.

35. The system of claim 24 having at least one of the following parameters:
- a particle Reynolds number (Rep) greater than about 0.002;
- a channel Reynolds number (Re) less than about 2300;
- a channel hydraulic diameter (Dh) larger than a particle diameter a; and
- a Womersley number (Wo) less than about 1.

* * * * *